United States Patent
Ihara

[19]

[11] Patent Number: 6,058,350
[45] Date of Patent: May 2, 2000

[54] ROAD MAP INFORMATION READOUT APPARATUS, RECORDING MEDIUM AND TRANSMITTING METHOD

[75] Inventor: Yasuhiro Ihara, Osaka, Japan

[73] Assignee: Matsushita Electric Industrial Co., Ltd., Osaka-fu, Japan

[21] Appl. No.: 08/856,797

[22] Filed: May 15, 1997

[30] Foreign Application Priority Data

May 16, 1996 [JP] Japan ..................................... 121190

[51] Int. Cl.[7] ............................................... G09B 29/00
[52] U.S. Cl. ........................................................ 701/208
[58] Field of Search ................................... 701/208, 211; 340/990, 995

[56] References Cited

U.S. PATENT DOCUMENTS

| | | | |
|---|---|---|---|
| 4,954,959 | 9/1990 | Moroto et al. ......................... | 364/449 |
| 4,984,168 | 1/1991 | Neukrichner et al. ................ | 364/449 |
| 5,168,542 | 12/1992 | Yamada et al. ....................... | 364/444 |
| 5,204,817 | 4/1993 | Yoshida ................................ | 364/449 |
| 5,285,391 | 2/1994 | Smith, Jr. et al. .................... | 364/443 |
| 5,513,110 | 4/1996 | Fujita et al. .......................... | 364/449 |
| 5,519,619 | 5/1996 | Seda ..................................... | 364/444 |

FOREIGN PATENT DOCUMENTS

| | | |
|---|---|---|
| 0 346 492 | 12/1989 | European Pat. Off. . |
| 0 706 031 | 4/1996 | European Pat. Off. . |
| 7-37067 | 2/1995 | Japan . |

OTHER PUBLICATIONS

Text of "Trend to Put High–Accuracy Route Guide System to Practical Use" in a seminar sponsored by Japan Industry Engineering Center on Feb. 12–13, 1995 (VI. 5.1 p106–107, VI. 5.4 p113–114).

Primary Examiner—Michael J. Zanelli
Attorney, Agent, or Firm—Wenderoth, Lind & Ponack, L.L.P.

[57] ABSTRACT

Road map information used in a vehicle navigation or the like is classified into main road groups comprising roads having a high frequency of utilization for route searching processing or the like and minor street groups comprising roads having a low frequency of utilization. Information relating to the roads belong to the main road group are recorded in such a format that the processing speed precedes reduction of a capacity required for recording. On the contrary, information relating to the roads belonging to the minor street group are recorded in such a format that a reduction of a capacity required for recording precedes the processing speed. The minor street group is divided into a plurality of arbitrary small groups to decrease the range of minor streets requiring information to the utmost in the route searching processing or the like. Further, one road which can be represented with one stroke of the brush and roads branching from the road are recorded upon being integrated as one group. Consequently, it is possible to realize a road map information readout apparatus in which the recording efficiency of the road map information is increased, thereby reducing the amount of information to be recorded.

33 Claims, 20 Drawing Sheets

A-I:UNIT ID

ROAD 1701 : LINK a,b,c
ROAD 1702 : LINK f,g,h

FIG. 18(a) PRIOR ART

| INDEX | 1 | 2 | 3 | 4 | 5 | 6 | 7 | 8 |
|-------|---|---|---|---|---|---|---|---|
| COST | FFFFh | 2h | 7h | 7h | FFFFh | FFFFh | 5h | FFFFh |

EXAMPLE OF COST TABLE

FIG. 18(b) PRIOR ART

| DATA CAPACITY | 14 |
|---|---|
| NUMBER OF NODES | 6 |
| INDEX | 1 |
| COST | FFFF |
| INDEX | 2 |
| COST | 2 |
| INDEX | 4 |
| COST | 7 |
| INDEX | 6 |
| COST | FFFF |
| INDEX | 7 |
| COST | 5 |
| INDEX | 8 |
| COST | FFFF |

EXAMPLE OF RECORDING SYSTEM 1

FIG. 18(c) PRIOR ART

| DATA CAPACITY | 10 |
|---|---|
| NUMBER OF NODES | 4 |
| INDEX | 2 |
| COST | 2 |
| INDEX | 3 |
| COST | 7 |
| INDEX | 4 |
| COST | 7 |
| INDEX | 7 |
| COST | 5 |

EXAMPLE OF RECORDING SYSTEM 2

F I G. 19 (a) PRIOR ART
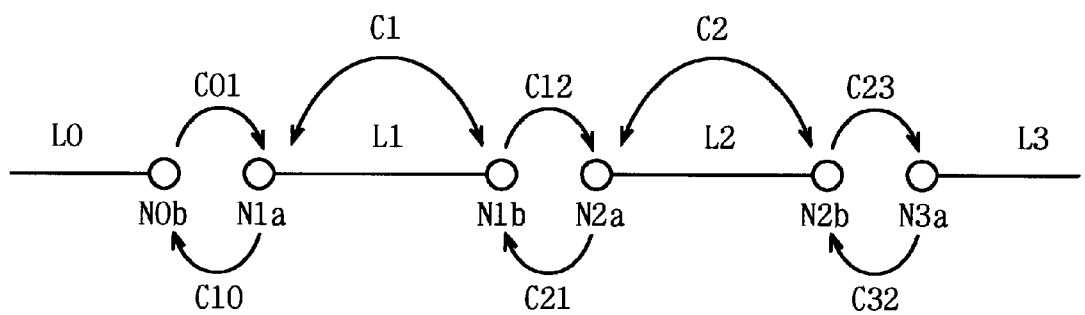
F I G. 19 (b) PRIOR ART
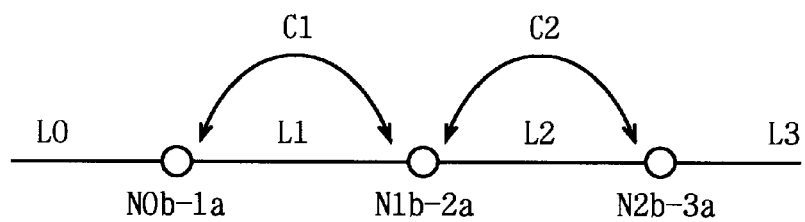

FIG. 21(a)

| NODE | NUMBER OF CONNECTED NODES | RECORD SIZE |
|---|---|---|
| A | 3 | 8 |
| B | 2 | 6 |
| C | 4 | 10 |
| D | 1 | 4 |
| E | 1 | 4 |
| F | 1 | 4 |
| 1 | 3 | 8 |
| 2 | 2 | 6 |
| 3 | 2 | 6 |
| 4 | 4 | 10 |
| 5 | 4 | 10 |
| 6 | 3 | 8 |
| 7 | 2 | 6 |
| 8 | 3 | 8 |
| 9 | 2 | 6 |
| 10 | 3 | 8 |
| 11 | 3 | 8 |
| 12 | 3 | 8 |
| 14 | 2 | 6 |
| 15 | 2 | 6 |
| 17 | 4 | 10 |
| 18 | 3 | 8 |
| 21 | 3 | 8 |
| TOTAL | — | 166 |

FIG. 21(b)

| | RECORDING FORMAT IN FIRST DOCUMENT | RECORDING FORMAT IN FIRST EMBODIMENT |
|---|---|---|
| COORDINATE DATA | 92 | 120 (24+96) |
| CONNECTION DATA | 166 | 32 (6+14+12) |
| TOTAL | 258 | 152 |

ROAD MAP INFORMATION READOUT APPARATUS, RECORDING MEDIUM AND TRANSMITTING METHOD

BACKGROUND OF THE INVENTION

1. Field of the Invention

The present invention relates generally to a road map information readout apparatus, a recording medium and a transmitting method, and more particularly, to a road map information readout apparatus, a recording medium and a transmitting method which are used for applications such as the display of an arbitrary position of a map, a detection of the current position, or a calculation of a route from the current position to a determination.

2. Description of the Related Art

Data including various types of information relating to roads used for a vehicle navigation or the like is generally referred to as vector map data. The vector map data is composed of data representing nodes, links, connection information, a link shape, and attribute information.

The node data is data mainly representing an intersection of roads. The link data is data representing a road connecting nodes. The link data is data having vector information. A road map is represented by a set of links. Therefore, such a map is referred to as a vector map. The connection information data is data representing a connection between nodes and links. The link shape data is data for complementing, when the map is insufficiently represented by only the nodes, the links and the connection information thereof, the map representation. For example, roads in mountainous and coastal areas may, in some cases, be bent. In this case, the bent shape of the road cannot be sufficiently represented by only one link data corresponding to the road. Therefore, in order to suitably represent the bent shape of the road, the bent shape is complemented as the link shape data. The attribute information data includes node attribute data relating to the nodes and link attribute data relating to the links. The node attribute data is data representing the name of an intersection, the presence or absence of a signal, and the like. The link attribute data is data representing the name of a road, the type of road, for example, a national road or a prefectural road, the number of lanes, and the presence or absence of a median strip.

A conventional map information display device using a vector map composed of the above-mentioned various types of data will be described.

Description is now made of the format of the vector map data used in the conventional map information display device. One example of the format of the conventional vector map data is a format disclosed in a text of "Trend to Put High-Accuracy Route Guide System to Practical Use" (hereinafter referred to as a first document) in a seminar sponsored by the Japan Industry Engineering Center. In the first document, a method of representing links and a compression of connection information are described in relation to the format of data.

FIG. 18 is a diagram showing a recording method for representing a connection of roads which is described in the first document. In the recording method described in the first document, identification data of a node to be connected, which is referred to as an index, and data representing the distance to a node at its destination of connection or time required for movement, which is referred to as a cost, are recorded for each node in order to record a connection between nodes. FIG. 18(a) illustrates an example of a cost table composed of arbitrary nodes. FIG. 18(a) illustrates a state where in a road network composed of eight nodes, one of the nodes in the road network is connected to the other four nodes (corresponding to indexes 2, 3, 4 and 7). A cost between the one node and the other node is represented by a hexadecimal number (for example, "2" in the index 2). Costs corresponding to nodes to which no connection is made are represented by setting a hexadecimal number "FFFF" (corresponding to indexes 1, 5, 6 and 8).

FIG. 18(b) illustrates an example of a recording system containing respective connection information shown in the cost table in FIG. 18(a) (hereinafter referred to as an example of the recording system 1). The example of the recording system 1 has as its object not only to simply record costs corresponding to the eight nodes but also to reduce the amount of information to be recorded. In the example of the recording system 1, when the nodes having the same cost are continuous, only information relating to the final node out of the continuous nodes is recorded, and information relating to the preceding nodes having the same cost are all deleted. Specifically, in the example of the recording system 1, both the costs corresponding to the indexes 3 and 4 are "7". Therefore, after the cost relating to the index 2 is recorded, the cost relating to the index 4 is recorded. Further, the costs corresponding to the indexes 5 and 6 are the same. Therefore, after the cost relating to the index 4 is recorded, the cost relating to the index 6 is recorded. Consequently, the number of nodes to be recorded is "6", exclusive of the indexes 3 and 5, with respect to the respective connection information shown in the cost table in FIG. 18(a). Further, the data capacity of the connection information of the nodes is the number of rows in the example of the recording system 1, i.e., "14".

In the example of the recording system 1, however, the connection information are also recorded with respect to the nodes to which no connection is made, thereby the recording efficiency is low. Therefore, in the first document, a recording system shown in FIG. 18(c) (hereinafter referred to as an example of the recording system 2) is employed as another recording system of connection information. In the example of the recording system 2, indexes and costs are recorded only with respect to nodes to which connection is made. Specifically, as shown in the example of the recording system 2, the connection information are recorded only with respect to indexes 2, 3, 4 and 7 in which costs exist.

As described in the foregoing, the amount of information to be recorded of the connection information is basically proportional to the square of the number of nodes in the example of the recording system 1, while the amount of information to be recorded can be reduced to the total number of nodes times the number of nodes which are connected to each of the nodes. In many cases, map data which is divided for each arbitrary region is generally used for vector map data. However, when the map data is divided for each region as described above, the number of nodes in the region is normally several hundred. On the other hand, the number of nodes connected to each of the nodes is three to four on average. This shows that in the example of the recording system 2, the capacity of map information can be significantly reduced, that is, compressed, as compared with that in the example of the recording system 1. The reduction of the connection information is hereinafter referred to as compression of connection information in the present specification.

The connection of roads can be basically represented by only the above-mentioned connection information. In practice, however a method of grouping links having the same attribute and recording a connection of the links has been also generally carried out. A method of representing the connection of links which is described in the first document will be described.

A method of representing the connection of links which is described in the first document is a method of not respectively recording the same attribute for each link, but grouping the links having the same attribute as one road, which can be drawn with one stroke of the brush, and recording one attribute for the grouped roads, when there exist a plurality of links having the same attribute. By this method, recording of one attribute is sufficient by grouping, though a plurality of attributes which are the same are recorded, thereby the recording efficiency is improved. This method is specifically employed for cases such as a case where it is desired to represent only country roads on a map.

FIG. 19 is a diagram showing the difference of a method of representing connection information of links depending on the presence or absence of such a grouping process. In FIG. 19, L0 to L3 denotes links. N0$b$ to N3$a$ and N0$b$–1$a$ to N2$b$–3$a$ denote the identification codes of nodes. C1 and C2 denote the costs of the links. Further, C01 to C32 denote data representing the connection states of each node (for example, the node number of a destination of connection, offset information, etc.).

FIG. 19($a$) illustrates a method of representing a unit of links which are not grouped. The method of representing a unit of links requires all the costs of the links as well as connection information of nodes at both ends of each of the links in order to connect the links which individually exist. On the other hand, FIG. 19($b$) illustrates a method of representing a row of links which are grouped. The method of representing a row of links is a method of recording links in relation to link information in the connection order of the links. In a method of representing a row of links, therefore, it is possible to omit not only the above-mentioned attribute information but also the connection information between the links, as compared with a method of representing a unit of links. Such a grouping of the connection information shall be hereinafter referred to as compression of road information in the present specification.

On the other hand, as the conventional map information display device, a device is disclosed in "Japanese Patent Laid-Open No. 7-37067" (hereinafter referred to as a second document), for example. FIG. 20 is a block diagram showing the construction of the map information display device described in the second document.

Referring to FIG. 20, the conventional map information display device will be described.

In FIG. 20, the map information display device described in the second document comprises vector map data 2001, data conversion portion 2002, first storage portion 2003, second storage portion 2008, position input portion 2007, image processing portion 2004, a frame memory 2005, and display portion 2006.

The capacity of the vector map data 2001 is reduced in accordance with a predetermined thinning method by the data conversion portion 2002. The predetermined thinning method is a method of thinning vector data for representing the shape of a road, that is, link shape data. In the map information display device described in the second document, processing for judging redundant points (end points of vectors) which are hardly affected at the time of displaying a road and thinning the points is performed by utilizing the fact that the shape of the road is represented as a set of line segments (vectors) upon being linearly approximated. The vector map data 2001 whose capacity is reduced is vector map data after data conversion (hereinafter referred to as conversion data), and is stored in the first storage portion 2003 (a medium such as a hard disk). On the other hand, the second storage portion 2008, constituted by a memory which can be accessed at high speed, and stores a required part of the conversion data stored in the first storage portion 2003. The second storage portion 2008 is constituted by a memory which can be accessed at a higher speed, although smaller in capacity, as compared with the first storage portion 2003. Consequently, the image processing portion 2004 can access map data stored in the second storage portion 2008 at high speeds in accordance with designation of a user through the position input portion 2007 (designation of a map which desires to be displayed), drawing the map data on the frame memory 2005, and display the map data using the displaying portion 2006.

As described in the foregoing, in the map information display device described in the second document, the vector map data is thinned, and an expensive storage medium such as a memory which can be accessed at a high speed is used, so that more map information can be stored. Therefore, in the map information display device described in the second document, if the capacity of the memory is the same, vector map data in a wider range can be stored. On the contrary, if the same map information is stored, the capacity of the memory may be smaller. Such thinning of the shape of the road shall be hereinafter referred to as compression of the shape of a road in the present specification.

As described in the foregoing, the map information display devices described in the first document and the second document realize compression of the map information by three compression portions: compression of connection information; compression of road information; and compression of a road shape. Consequently, the map information display devices described in the first document and the second document allow for a reduction of the capacity of the map information recording medium, shortening of time required to read out the map, and recording of information, such as sightseeing information, other than the map information on the same medium.

In recent years, various practical map information display devices and vehicle navigation systems have been developed with vector map data which is subjected to the conventional compression techniques of map information being used as a premise. In the above-mentioned conventional map information display devices or the like, a large-capacity recording medium such as a CD-ROM or a hard disk has been employed as a recording medium of map information in the present conditions. However, in the future, radio or wire transmission of the map information, and utilization of the map information in a portable information equipment in which the capacity of a recording medium is largely limited will be considered. Accordingly, the map information must not have a large capacity as in the present conditions but a smaller capacity under these applications. However, the conventional map information display device or the like has the following problems, thereby the problem of the reduction of the capacity cannot be solved.

First, in a method of compression of connection information in the conventional map information display device or the like, connection information of roads are recorded in the same data format with respect to all the roads.

Roads can be mainly divided into main roads and minor streets. The main road is a road which is considered to be utilized by a large number of people, for example, a country road or a highway. The minor street is a road which is considered to be utilized by a small number of people (or to be usable by only particular persons), for example, a life road in a residential street, a farm road or a path through a forest, contrary to the main road. When the roads are divided into main roads and minor streets in the map information display device or the like, the frequency of use of connection information of roads differs between the main roads and the minor streets. Particularly, in route search processing for calculating a route to a desired position in the map information display device or the like, connection information of main roads is required in a wide range. However, connection information of the minor streets is required only in the restricted range in the vicinity of the current position (a starting point) or a destination. In the actual map data, not less than the half of all the roads may be minor streets in the detailed map of an urban area, for example, in many cases.

However, the conventional map information display device or the like stores the connection information of the roads in the same data format with respect to all the roads irrespective of the above-mentioned contents. Therefore, almost all the connection information is occupied by the connection information of the minor streets low in frequency of use. That is, the problem that the capacity of the map information is large still exists.

Second, in a method of compression of road information in the conventional map information display device or the like, roads cannot be sufficiently grouped.

The compression of road information is for grouping a row of links which are of the same road type and can be drawn with one stroke of the brush. However, there are actually many roads which are of the same type but cannot be drawn with one stroke of the brush. For example, in an urban highway (a metropolitan highway, for example), ramps exist with relatively small spacing. Ramps are an entrance and an exit connecting a main lane of the highway and a general road. Accordingly, the main lane of the highway branches for each ramp. Therefore, when the main lane is drawn with one stroke of the brush to form a group, short links which are merged into the general road and branching for each ramp remain without being included in the group. Consequently, the links have the same attribute but are not directly connected to each other, thereby the links, together with their attributes, must be respectively recorded.

Such a phenomenon is frequently seen in main roads in an urban area, for example, a road portion connecting upper and lower lanes, which are separated, of a main road. Therefore, in the conventional map information display device or the like, the fact that links which can be grouped are limited to a set of links which can be drawn with one stroke of the brush causes the problem that the capacity of the map information is large.

Third, in a method of compression of the shape of a road in the conventional map information display device or the like, the representations of a bent road, a gently curved road, a curved road such as an interchange of a toll road present a problem.

In the method of compression of the shape of a road in the conventional map information display device or the like, a shape close to a curve is represented by setting a large number of interpolation points for representing the shape of a road such as a bent road to perform linear approximation between the interpolation points. Consequently, data representing a lot of interpolation points causes the problem that the capacity of the map information is large.

As described in the foregoing, in the prior art, the map information cannot be sufficiently compressed by the above-mentioned remaining three problems. Since the capacity of the map information is still large, therefore, it is still difficult to realize the transmission of the map information, the storage of the map information in a semiconductor memory, and the like.

SUMMARY OF THE INVENTION

Therefore, an object of the present invention is to provide a road map information readout apparatus, a recording medium and a transmitting method, in which the amount of information to be recorded of road map information used in a vehicle navigation system or the like is reduced.

In order to attain the above-mentioned object, the present invention has the following characteristics.

A first aspect of the present invention is directed to a road map information readout apparatus for reading out road map information from a recording medium and outputting its connection information, which comprises:

a road map information recording medium in which roads included in all or part of areas on a road map are previously classified into a plurality of groups, different recording formats are respectively assigned to the plurality of groups, and connection information of the roads included in each of the groups is recorded in accordance with the recording format assigned to the group;

a readout range designation portion for designating a predetermined readout range;

a readout control portion for reading out from the road map information recording medium the connection information corresponding to the predetermined readout range; and an output portion for outputting the connection information read out by the readout control portion.

As described in the foregoing, in the first aspect, a road map is classified into a plurality of arbitrary groups, different recording formats are respectively assigned to the groups, and connection information of the roads in each of the groups is recorded in a road map information recording medium in accordance with the assigned recording format. That is, a recording format suitable for the property of the range of the map is suitably assigned. Consequently, it is possible to reduce the capacity of map information relating to all roads to be recorded in the recording medium. Correspondingly, it is possible to increase the processing speed of the road map information readout apparatus.

Preferably, the above-mentioned plurality of groups are classified into main road groups comprising roads having a relatively high frequency of use and sub road groups comprising roads having a lower frequency of use than the roads in the main road groups. The sub road group is assigned a recording format in which a smaller amount of information to be recorded than that of a recording format assigned to the main road group is sufficient. That is, it is preferable that the main road group is assigned a recording format which takes importance to processing speed, and the sub road group is assigned a recording format which takes importance to a reduction of the capacity.

It is considered that the recording format assigned to the main road group is taken as a format for recording for each node (intersection), the connection state regarding each node as a table. It is considered that the recording format assigned to the sub road group is taken as a format for recording for each node information for specifying a node to succeed the node and a pen up flag indicating connection or non-connection. Consequently, it is possible to reduce the capacity of map information relating to all the roads to be recorded in the recording medium, and it is possible to further increase the processing speed of the apparatus.

In the case of a road shape in which a first road belonging to the main road group and a second road belonging to the sub road group intersect each other, information relating to an auxiliary point representing an intersection on the first road and information for specifying the auxiliary point from the second road may be further recorded in the recording medium. Consequently, information indicating that the first road and the second road intersect each other can be found without calculating the coordinates of the intersection while realizing the reduction of the capacity of connection information relating to the first road. Consequently, it is possible to easily obtain connection information of roads which intersect each other.

Furthermore, the road belonging to the sub road group may be recorded upon being further classified into small groups. Consequently, only roads belonging to the required small group can be selectively subjected to conversion processing. It is possible to further shorten the time required for conversion processing of road connection information. Even in the road map information in which an amount of information to be recorded is compressed, it is possible to obtain the results of road connection processing at a high speed.

A second aspect of the present invention is directed to an apparatus for reading out road map information from a recording medium and outputting its connection information, which comprises:

a road map information recording medium in which a road whose connection state is represented with one stroke of the brush and at least one road branching from the road and having the same attribute are grouped, and connection information of both the roads is recorded as connection information in one group;

a readout range designation portion for designating a predetermined readout range;

a readout control portion for reading out from the road map information recording medium the connection information corresponding to the predetermined readout range; and an output portion for outputting the connection information read out by the readout control portion.

As described in the foregoing, in the second aspect, one group of roads which are connected with one stroke of the brush and roads having the same attribute and branching which are not connected with one stroke of the brush from the roads are together managed and are recorded in a road map information recording medium. Consequently, it is possible to reduce the capacity of map information relating to all roads to be recorded in the road map information recording medium. Correspondingly, it is possible to increase the processing speed of the road map information readout apparatus.

A third aspect of the present invention is directed to an apparatus for reading out road map information from a recording medium and outputting its connection information, which comprises:

a road map information recording medium having road information for connecting nodes in the shape of a curve drawn on the basis of interpolation points by predetermined curve interpolation processing and having the interpolation points so recorded therein as to be positioned on the shape of the curve;

a readout range designation portion for designating a predetermined readout range;

a readout control portion for reading out from the road map information recording medium the interpolation points corresponding to the predetermined readout range; and an output portion for outputting the interpolation points read out by the readout control portion.

As described in the foregoing, in the third aspect, predetermined curve interpolation processing for drawing a curve passing on a plurality of interpolation points is used, and the minimum interpolation points at which a road shape can be represented by the processing are recorded in a road map information recording medium. Therefore, the number of interpolation points for representing a curved road can be reduced. Consequently, it is possible to reduce the capacity of map information relating to all roads to be recorded in the road map information recording medium. Correspondingly, it is possible to increase the processing speed of the road map information readout apparatus.

A fourth aspect of the present invention is directed to a road map information recording medium on which road map information is recorded, which is characterized in that roads included in all or part of areas on a road map are previously classified into a plurality of groups, different recording formats are respectively assigned to the plurality of groups, and connection information of the roads included in each of the groups is recorded in accordance with the recording format assigned to the group.

As described in the foregoing, in the fourth aspect, a road map is classified into a plurality of arbitrary groups, and different recording formats are respectively assigned to the groups, and connection information of roads in each of the groups is recorded in a road map information recording medium in accordance with the assigned recording format. That is, a recording format suitable for the property of the range of the map is suitably assigned to the road map information recording medium, so that the capacity of map information relating to all the roads recorded is reduced. Therefore, it is possible to reduce the memory capacity of the road map information readout apparatus employed as a reading buffer of road map information. Consequently, it is possible to utilize the road map information even in another system having a small memory capacity.

Preferably, the above-mentioned plurality of groups are classified into main road groups comprising roads having a high frequency of use and sub road groups comprising roads having a lower frequency of use than that of the roads in the main road group. The sub road group is assigned a recording format in which a smaller amount of information to be recorded than that of a recording format assigned to the main road group is sufficient. That is, it is preferable that the main road group is assigned a recording format which attaches importance to processing speed, and the sub road group is assigned a recording format which attaches importance to a reduction of the capacity.

It is considered that the recording format assigned to the main road group is taken as a format for recording for each node (intersection), the connection state regarding each node as a table. It is considered that the recording format assigned to the sub road group is taken as a format for recording for each node information for specifying a node to succeed the node and a pen up flag indicating connection or non-connection. Consequently, the capacity of map information relating to all roads further recorded in the recording medium is reduced.

In the case of a road shape in which a first road belonging to the main road group and a second road belonging to the sub road group intersect each other, information relating to an auxiliary point representing an intersection on the first road and information for specifying the auxiliary point from the second road may be further recorded in the recording medium. Consequently, information indicating that the first road and the second road intersect each other can be found without calculating the coordinates of the intersection while realizing the reduction of the capacity of connection information relating to the first road. Consequently, it is possible to easily obtain connection information of roads which intersect each other.

Furthermore, the roads belonging to the sub road group may be recorded upon being further classified into small groups. Consequently, only roads belonging to the required small group can be selectively subjected to conversion processing. It is possible to further shorten the time required for conversion processing of road connection information. Even in road map information whose amount of information to be recorded is compressed, it is possible to obtain the results of road connection processing at a high speed.

A fifth aspect of the present invention is directed to a road map information recording medium on which road map information is recorded, which is characterized in that a road whose connection state is represented with one stroke of the brush and at least one road branching from the road and having the same attribute are grouped, and connection information of both the roads is recorded as connection information in one group.

As described in the foregoing, in the fifth aspect, one group of roads which are connected with one stoke of the brush and roads having the same attribute and branching which are not connected with one stroke of the brush from the roads are also together managed and are recorded in a road map information recording medium. That is, the capacity of map information relating to all the roads recorded in the recording medium is reduced. Consequently, it is possible to reduce the memory capacity of the road map information readout apparatus employed as a reading buffer of road map information. Consequently, it is possible to utilize the road map information even in another system having a small capacity.

A sixth aspect of the present invention is directed to a road map information recording medium on which road map information is recorded, which is characterized in that the road map information includes road information for connecting nodes in the shape of a curve drawn on the basis of interpolating points by predetermined curve interpolation processing, and has the interpolation points so recorded therein as to be positioned on the shape of the curve.

As described in the foregoing, in the sixth aspect, predetermined curve interpolation processing for drawing a curve passing on a plurality of interpolation points is used, and the minimum interpolation points at which a road shape can be represented by the processing are recorded in a road map information recording medium, that is, a recording medium whose amount of information to be recorded is reduced by decreasing the number of interpolation points for representing a curved road. Therefore, it is possible to reduce the memory capacity of the road map information readout apparatus employed as a reading buffer of road map information. Consequently, it is possible to utilize the road map information even in another system having a small memory capacity.

A seventh aspect of the present invention is directed to a road map information transmitting method for transmitting to an apparatus using road map information the road map information by communication, which is characterized in that the road map information is information in which roads included in all or part of areas on a road map are previously classified into a plurality of groups, different recording formats are respectively assigned to the plurality of groups, and connection information of the roads included in each of the groups is recorded in accordance with the recording format assigned to the group.

As described in the foregoing, in the seventh aspect, there is provided a method of classifying a road map into a plurality of arbitrary groups, respectively assigning different recording formats to the groups, and transmitting road map information in which connection information of roads in each of the groups is recorded in accordance with the assigned recording format, that is, a transmitting method using information of such a format that a amount of information to be recorded is small. Consequently, it is possible to shorten the time the required for transmission in addition to the effect described in the fourth aspect. Therefore, the method has such an effect that transmission of road map information from an external device is easily realized.

Preferably, the above-mentioned plurality of groups are classified into main road groups comprising roads having a high frequency of use and sub road groups comprising roads having a lower frequency of use than that of the roads in the main road group. The sub road group is assigned a recording format in which a smaller amount of information to be recorded than that of a recording format assigned to the main road group is sufficient. That is, it is preferable that the main road group is assigned a recording format which attaches importance to the processing speed, and the sub road group is assigned a recording format which attaches importance to a reduction of the capacity.

It is considered that the recording format assigned to the main road group is taken as a format for recording for each node (intersection), the connection state regarding each node as a table. It is considered that the recording format assigned to the sub road group is taken as a format for recording for each node information for specifying a node to succeed the node and a pen up flag indicating connection or non-connection. Consequently, it is possible to further reduce transmission time.

In the case of a road shape in which a first road belonging to the main road group and a second road belonging to the sub road group intersect each other, information relating to an auxiliary point representing an intersection on the first road and information for specifying the auxiliary point from the second road may be further recorded in the recording medium. Consequently, it is possible to further reduce transmission time.

Furthermore, the roads belonging to the sub road group may be recorded upon being further classified into small groups. Consequently, only roads belonging to the required small group can be selectively subjected to conversion processing. It is possible to further shorten the time required for conversion processing of road connection information. Even in road map information whose amount of information to be recorded is compressed, it is possible to obtain the results of road connection processing at a high speed.

An eighth aspect of the present invention is also directed to a road map information transmitting method for transmitting to an apparatus using road map information the road map information by communication, which is characterized in that the road map information is information in which a road whose connection state is represented with one stroke of the brush and at least one road branching from the road and having the same attribute are grouped, and connection information of both the roads is recorded as connection information in one group.

As described in the foregoing, in the eighth aspect, there is provided a method of transmitting road map information in which one group of roads connected with one stroke of the brush and roads having the same attribute and branching which are not connected with one stroke of the brush from the roads are also together managed and are recorded. Consequently, it is possible to shorten time required for transmission in addition to the effect described in the fifth aspect. Therefore, the method has such an effect that transmission of road map information from an external device is easily realized.

A ninth aspect of the present invention is directed to a road map information transmitting method for transmitting to an apparatus using road map information the road map information by communication, which is characterized in that the road map information is information having road map information connecting the nodes in the shape of a curve drawn on the basis of interpolation points by predetermined curve interpolation processing and having the interpolation points so recorded therein as to be positioned on the shape of the curve.

As described in the foregoing, in the ninth aspect, there is provided a method of transmitting, using predetermined curve interpolation processing for drawing a curve passing on a plurality of interpolation points, road map information in which minimum interpolation points at which a road shape can be represented by the processing. Consequently, it is possible to shorten the time required for transmission in addition to the effect described in the sixth aspect. Therefore, the method has such an effect that transmission of road map information from an external device is easily realized.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 18(a)–18(c) are diagrams showing one example of the conventional recording format of a connection of roads;

FIGS. 19(a)–19(b) are diagrams for explaining a conventional method of representing connection information of grouped links;

FIGS. 21(a)–21(b) are diagrams showing a comparison between the conventional map information display device and the road map information readout apparatus according to the first embodiment of the present invention in the amount of information to be recorded of map information.

DESCRIPTION OF THE PREFERRED EMBODIMENTS

Figure 1:
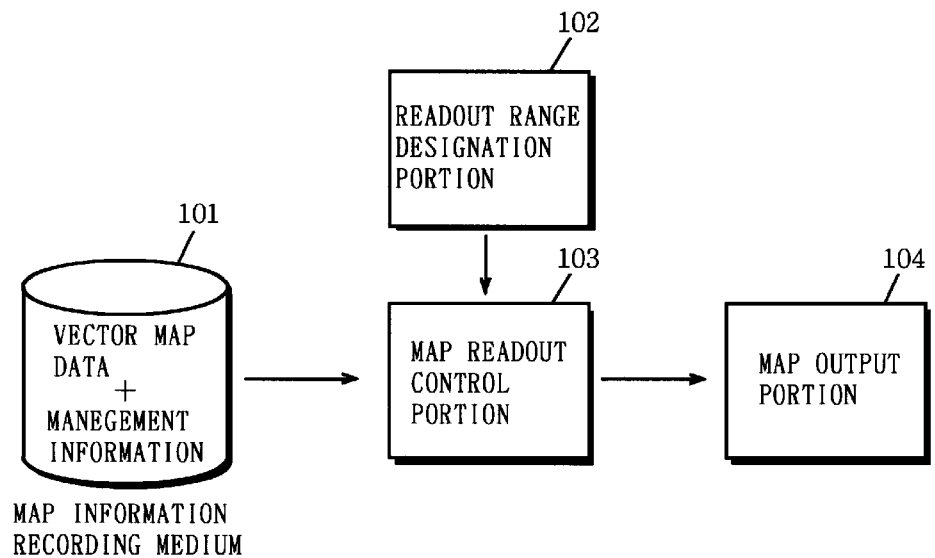
FIG. 1 is a block diagram showing the construction of a road map information readout apparatuses according to all embodiments of the present invention.

Embodiments of the present invention will be described while referring to the drawings.

(First Embodiment)

FIG. 1 is a block diagram showing the construction of a road map information readout apparatus according to a first embodiment of the present invention. In FIG. 1, the road map information readout apparatus according to the first embodiment of the present invention comprises a map information recording medium 101, a readout range designation portion 102, a map readout control portion 103, and a map output portion 104.

Map information comprising vector map information and management information is recorded in the map information recording medium 101. The map information recording medium 101 in the first embodiment may be a map information recorder. The readout range designation portion 102 designates the range of a map which a user desires to read out. The map readout control portion 103 reads out required map information from the map information recording medium 101 in accordance with the range designated by the readout range designation portion 102. The map output portion 104 displays the map information read out by the map readout control portion 103. Further, the map information is utilized for a correction of the detection of the current position, searching of a route, and the like besides being displayed by the map output portion 104.

Operations performed by the road map information readout apparatus according to the first embodiment of the present invention constructed as described above will be described below.

The road map information readout apparatus according to the first embodiment of the present invention first classifies roads into main roads having a high frequency of use of connection information and minor streets having a low frequency of use. The recording format of connection information relating to the minor streets is taken as a recording format having a smaller capacity than that of a recording format relating to the main roads. Consequently, the capacity of map information to be recorded in the road map information readout apparatus is compressed.

Figure 2:
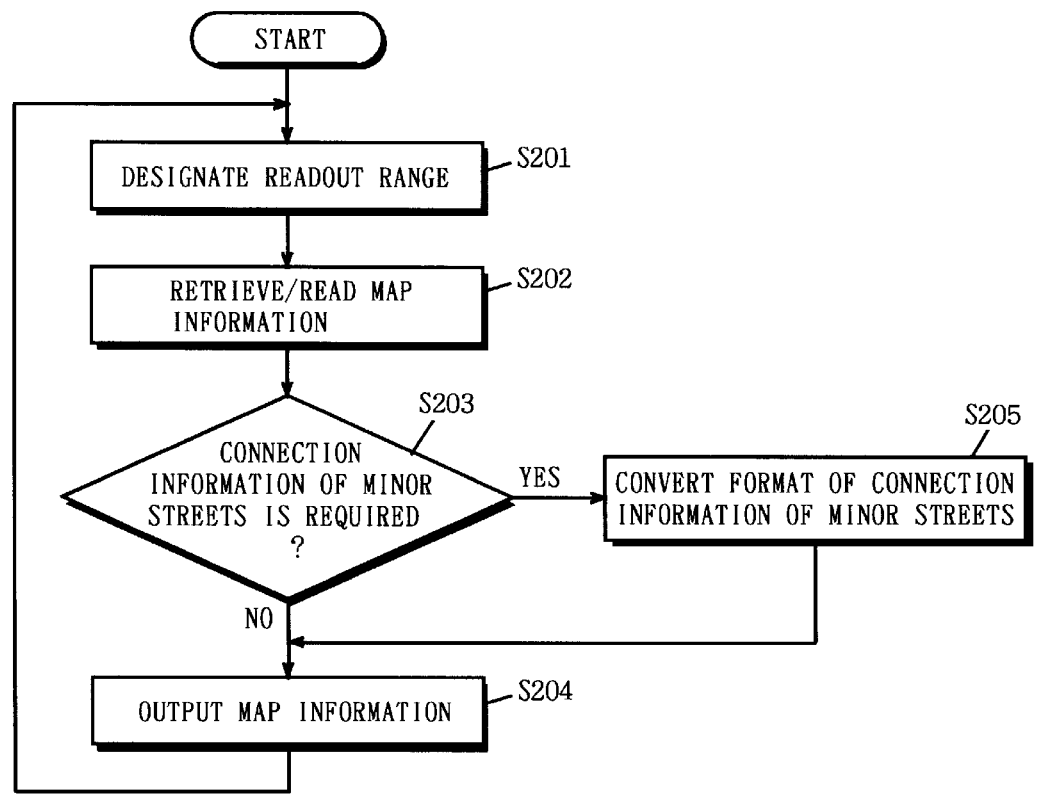
FIG. 2 is a flow chart showing operations performed by the road map information readout apparatuses according to all embodiments of the present invention.

FIG. 2 is a flow chart showing the procedure for reading out a map in the road map information readout apparatus according to the first embodiment. Referring now to FIG. 2, the operations will be described.

When the procedure for reading a map is started, the range in which the map is read out is first designated (step S201). The designation may be performed by a user directly inputting the range, or may be performed upon automatically determining an arbitrary range in the vicinity of the current position of a vehicle in a vehicle navigation system or the like. Alternatively, it may be performed upon automatically determining a map required in the route searching processing or the like in the road map information readout apparatus. After the range in which a map is read out is designated, map information in the designated range is read out upon being retrieved from the map information recording medium 101 (step S202).

Figure 3:
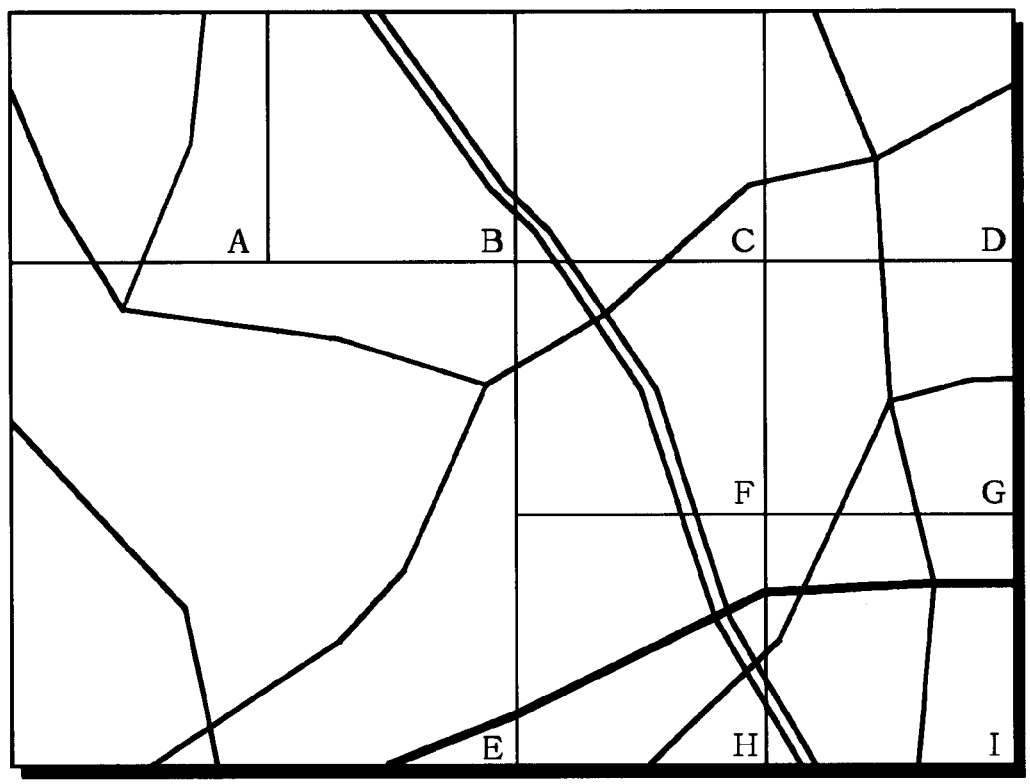
FIG. 3 is a diagram showing a map unit used in the road map information readout apparatuses according to all embodiments of the present invention.

FIG. 3 illustrates one example of the outline of a map used in the road map information readout apparatus according to the first embodiment. As shown in FIG. 3, a map is generally a set of units of various sizes. As management information relating to each of the units, information relating to the longitude and the latitude of the origin of the unit (for example, a lower left corner of a unit frame) and the sizes in the directions of the longitude and the latitude of the unit are generally recorded. A map unit which is overlapped with the designated range is retrieved utilizing the management information.

FIG. 2 will be referred to again. When the required map information is read out in the step S202, the necessity of connection information of minor streets is judged (step S203). When the connection information of minor streets is required, the format of the connection information of minor streets is converted (step S205). On the other hand, when the connection information of minor streets is not required, the map information is outputted as it is (step S204). The output may be display of a map, or may be utilized as a map in the vicinity of the current position utilized for position detection processing of a vehicle, or utilized as a map for route searching processing. After the map information is outputted, the program is returned to the step S201. In the step S201, the foregoing processing is repeated again.

The foregoing is the outline of the flow of map reading processing. The steps S203 and S205 will be further described in detail.

Figure 4:
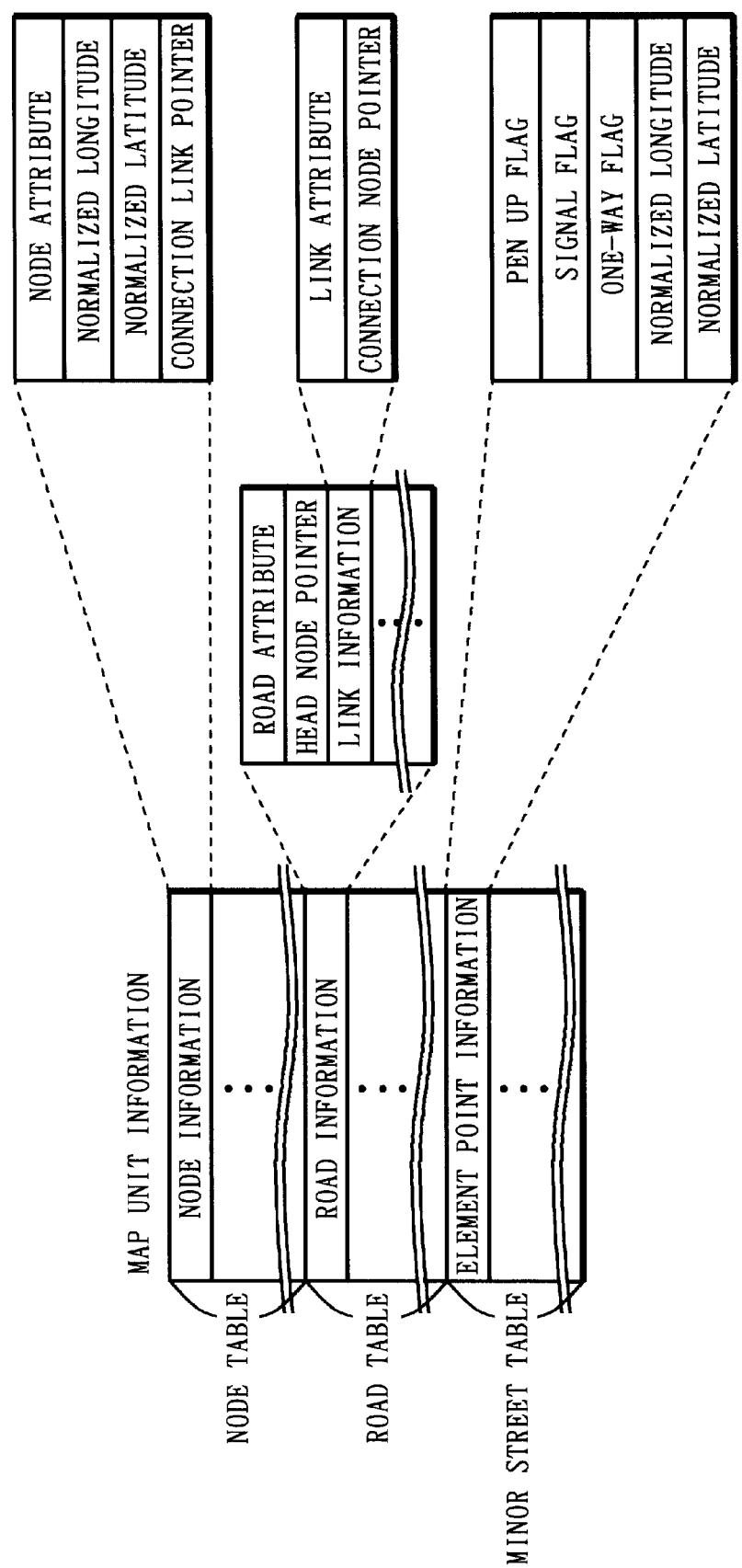
FIG. 4 is a diagram showing the recording format of map unit information in a road map information readout apparatus according to a first embodiment of the present invention.

FIG. 4 is a diagram showing the recording format of map information used in the road map information readout apparatus according to the first embodiment of the present invention. In FIG. 4, map unit information which is information relating to the whole of a map is composed of a node table and a road table in which information relating to main roads are recorded, and a minor street table in which information relating to minor streets is recorded. Node information which is data representing an intersection of main roads is recorded in the node table. Road information which is a set of links connecting intersections of main roads is recorded in the road table. The information relating to minor streets is recorded as element point information in the minor street table. The node information is composed of a node attribute which is ,for example, data representing the presence or absence of a signal at an intersection, normalized longitude and normalized latitude which are data representing the position of the intersection, and a connection link pointer. The road information is composed of a road attribute which is data representing the type of road such as a country road or a toll road which is the outline of links, a head node pointer, and link information which is data representing the inner surfaces of links. The link information is composed of a link attribute which is data representing one-way information, the number of lanes, and the like, and a connection node pointer. The element point information is composed of a pen up flag, a signal flag, a one-way flag, and normalized longitude and normalized latitude which are data representing the position of an element point.

Figure 5:
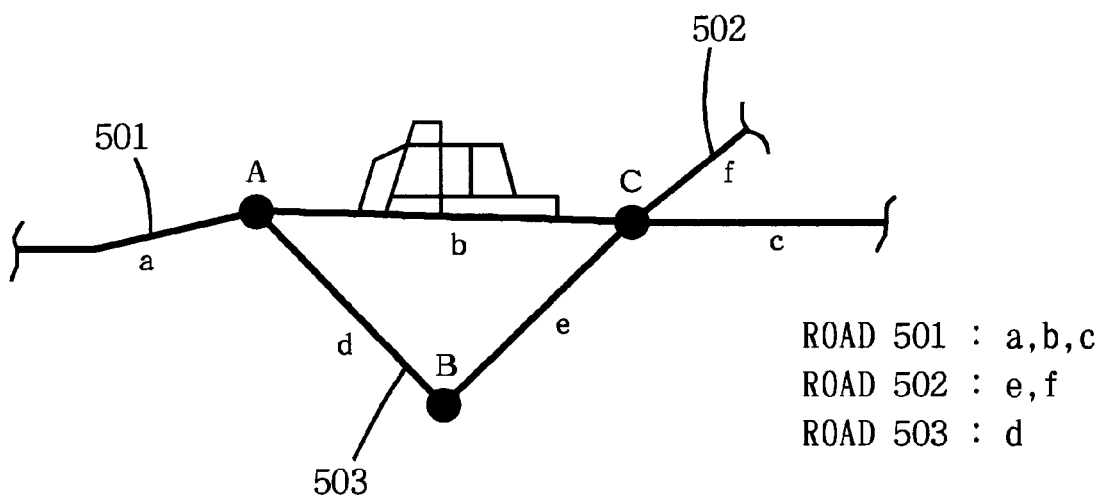
FIG. 5 is a diagram showing one example of a road network.

FIG. 5 illustrates one example of map information. In FIG. 5, A to C denote intersections of main roads, and a to f denotes links connecting the intersections of the main roads. Further, a plurality of thin lines added to the link b denote minor streets.

As described above, in the recording format of the map information in the first embodiment, as information relating to main roads, data representing intersections and data representing links of the intersections are respectively recorded in the node table and the road table. Therefore, the recording format of the map information in the first embodiment allows a link connected to each of intersections to be easily known.

A recording method relating to main roads will be described in detail while referring to FIGS. 4, 5, and 6.

Nodes at both ends of each of the links are taken as a starting point node and an end point node. In the road information, the starting point node of the first link is referred to as a head node of a road. The end point node of each of the links shall be the starting point node of the subsequent link. In FIG. 5, a road 502 shall be composed of the link e and the link f, and the node B shall be the head node of the road 502. Further, a road 503 shall be composed of only the link d, and the node B shall be the end point node of the link d.

Figure 6:
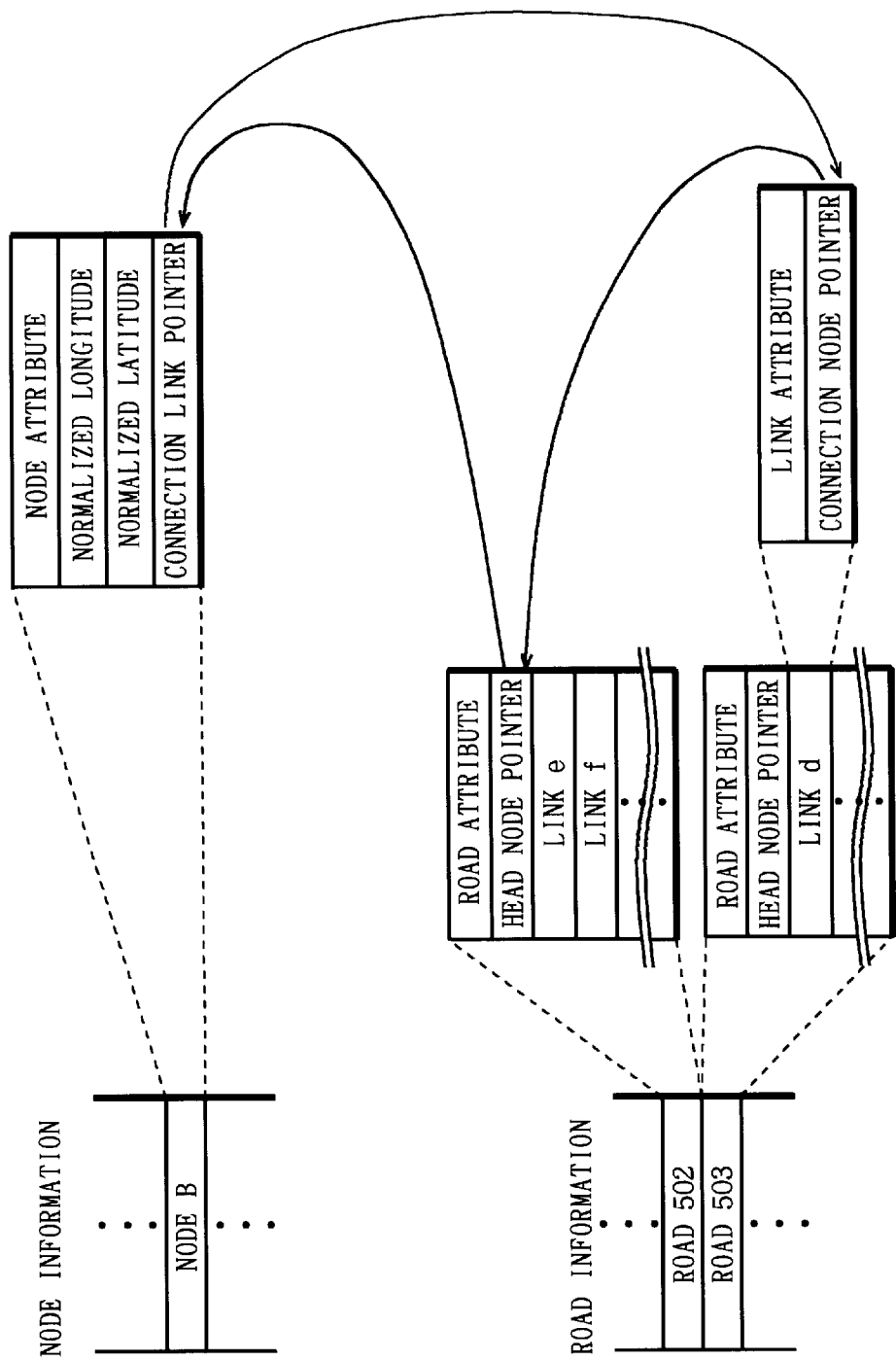
FIG. 6 is a diagram showing a cyclic address designating and recording method of road connection information of main roads.

FIG. 6 illustrates one example of recording in the node table and the road table in a case where the node B shown in FIG. 5 is paid attention to. An address at which the connection node pointer of the link d is recorded is recorded in the connection link pointer of the node B. An address at which the head node pointer of the road 502 is recorded is recorded in the connection node pointer of the link d. An address at which the connection link pointer of the node B is recorded is recorded in the head node pointer of the road 502. In thus processing a certain node, portions where information relating to the node is recorded are successively so pointed to by a pointer that the processing can circulate the portions. Consequently, recording of only one connection link pointer on the node information is sufficient irrespective of the number of links connected to the node.

Consequently, in the recording format of the map information in the first embodiment, when links connected to a certain node are examined, addresses pointed to by the connection link pointer are successively followed, so that information relating to all the links to be connected are found. Consequently, when the links are examined, information relating to all the links need not be retrieved from a large amount of map information, thereby required connection information can be quickly obtained. High speed retrieval of the connection information is particularly required in route searching processing. Consequently, it is desirable that the above-mentioned recording format is employed with respect to main roads which can be often used for the route searching processing.

The recording format of the information relating to minor streets will be described in detail.

The recording format of the road connection information of minor streets aims at compressing information, as described above, thereby the recording format shown in the description of main roads is not used. The recording format of the road connection information of minor streets basically has the same data structure as that of map information representing a road shape as a mere picture including no connection attribute data as shown in FIG. 4. The structure is close to a format used in map information for display. The normalized longitude and the normalized latitude are relative coordinates in each map unit. Consequently, the normalized longitude and latitude must be added to the coordinates of the origin of the unit in order to calculate the true longitude and latitude.

Figure 7:
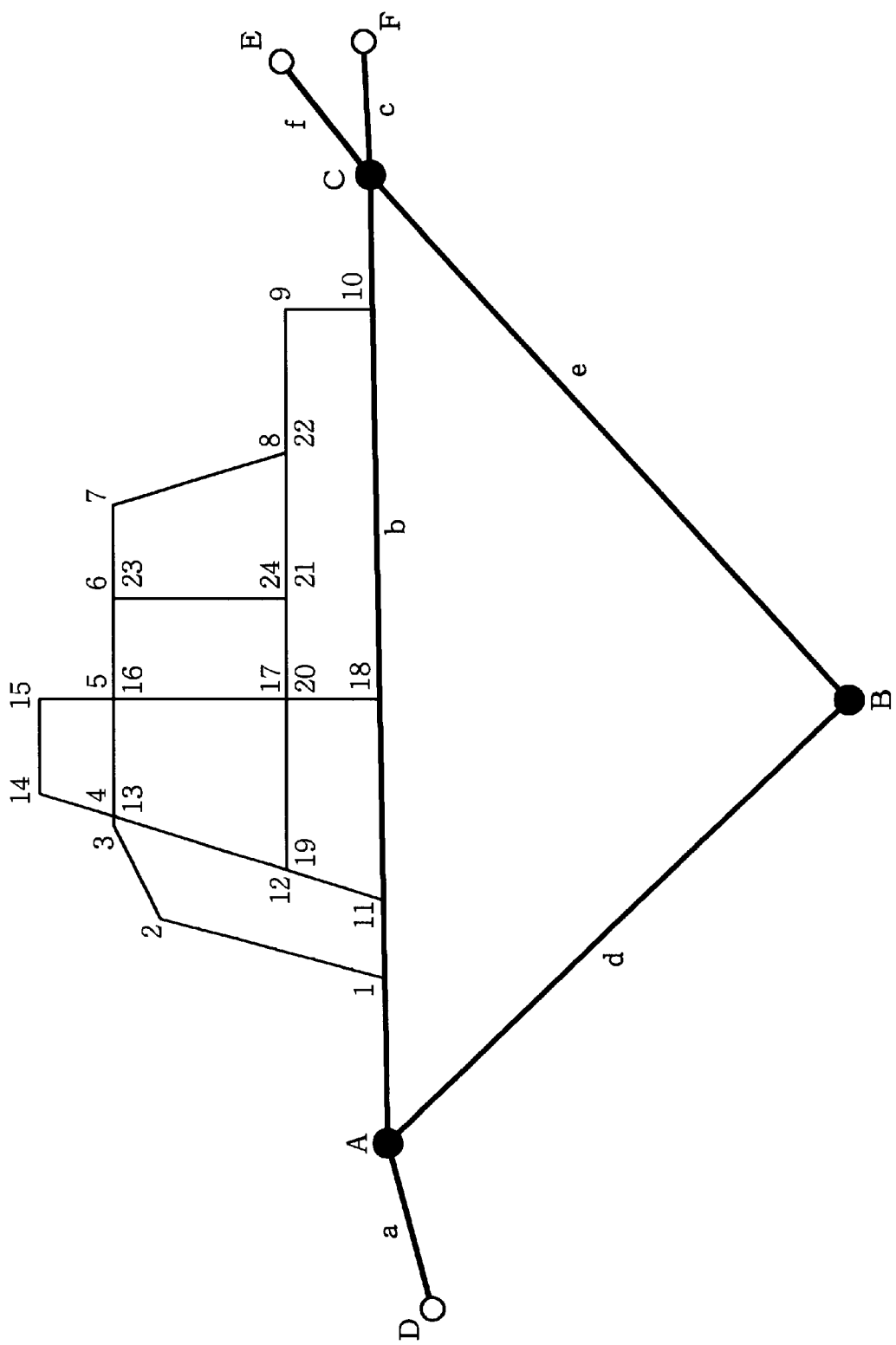
FIG. 7 is a diagram showing, in an enlarged manner, minor streets shown in FIG. 5 relating to the description of the recording format in the first embodiment.

FIG. 7 is a diagram showing, in an enlarged manner, minor streets in the vicinity of the link b in FIG. 5. In FIG. 7, numerals 1 to 24 denote element points constituting the minor streets. A line connecting the element points is a road. Referring to FIGS. 4 and 7, description is made of a method of recording the road connection information of minor streets.

The recording method is a method of connecting element points constituting minor streets with one stroke of the brush to produce a road network shown in FIG. 7 and recording the contents of the element points in the order in which the element points are connected with one stroke of the brush. However, the whole of the road network cannot be necessarily drawn with one stroke of the brush. Therefore, the pen up flag indicating whether drawing with one stroke of the brush is continued or interrupted is used. When the pen up flag is "zero", the element point and the preceding element point shall be connected to each other by a road. Consequently, the pen up flag is generally "zero". A case where the pen up flag is "1" is a case where the road cannot be continuously drawn with one stroke of the brush, that is, a case where the subsequent drawing with one stroke of the brush is started. The foregoing will be specifically described using the minor streets shown in FIG. 7. First, element points from an element point 1 to an element point 10 can be connected with one stroke of the brush, thereby the pen up flags in respective element point information are "zero". Then, there exists no minor street from the element point 10 to an element point 11 (in this case, there shall exist no main road (link b)), thereby the pen up flag of the element point 11 is "1". Element points from the element point 11 to an element point 18 can be connected with one stroke of the brush, thereby the pen up flags of the element points 12 to 18 are "zero". Similarly, the pen up flags of element points 19 and 23 are "1", and the pen up flags of the other element points are "zero".

The signal flag is a flag indicating the presence or absence of a signal at the position of its element point, and is "1" when there is a signal. The one-way flag represents information relating to one-way traffic using two bits. The first bit out of the two bits is a flag representing the presence or absence of regulation of one-way traffic, which is "1" when a road between its element point and the preceding element point is a one-way road. The second bit out of the two bits indicates the direction of passage in a case where there is regulation of one-way traffic, which is "zero" if passage is allowed in the direction from the preceding element point to the current element point, while being "1" if passage is allowed in the opposite direction.

In the recording format in the first embodiment, it is thus possible to represent road shapes and connection information of minor streets in a format of the element point information. In the map information readout apparatus according to the first embodiment of the present invention, the capacity of map information is reduced, that is, the compression rate of information is improved by the recording format, as compared with a conventional apparatus described in the above-mentioned first document.

With respect to the improvement of the compression rate of information, the compression rates (the recording capacities) of the recording format in the first embodiment and the recording format described in the first document are compared with each other by calculating their numerical values using the road shown in FIG. 7.

As the premise of the calculation, it is assumed that respective two bytes with respect to information relating to the longitude and the latitude, one byte with respect to information relating to specification of a node (an index or a pointer) and a cost, and one bit with respect to a flag (=0.125 bytes, where two bits with respect to a one-way flag) are required. However, the node attribute and the road attribute are not considered in both the formats.

With respect to the recording format described in the first document, a capacity required to record map information is first calculated. The recording format described in the first document relates to an arbitrary node irrespective of main roads and minor streets for recording information relating to another node connected to the node. Consequently, coordinate information and connection information may be found with respect to each of the nodes A to F and 1 to 21 in FIG. 7 (when the numbers are overlapped with each other at one node, the lower number is used). The coordinate information requires information relating to the longitude and the latitude (2×2=4 bytes) with respect to one node, thereby a capacity required to represent the coordinates of all the nodes (23 nodes) is as follows:

$$23 \times 4 = 92 \text{ [bytes]}$$

The connection information may be found by calculating the record size from the number of nodes connected to each of the nodes, as shown in FIG. 21(a). For example, calculation is made with respect to the node A. The number of nodes connected to the node A is three, i.e., B to D. Each of the nodes connected to the node A requires one byte with respect to respective information relating to the index and the cost. Further, the connection information requires one byte with respect to respective information relating to the capacity of data and the number of nodes, as shown in FIG. 18(c). Consequently, the record size of the node A requires 3×2+2=8 [bytes]. Therefore, when, the record sizes are calculated with respect to all the 23 nodes and are added, the connection information can be found. The connection information of all the roads shown in FIG. 7 is 166 bytes (see FIG. 21(a)).

A capacity required to record map information is then calculated with respect to the recording format in the first embodiment. Main roads are first considered. The main roads have six nodes, that is, A to F, as described above. The node table is composed of information relating to the longitude and the latitude (2×2=bytes) and a pointer (one byte), as shown in FIG. 4, for each node. Consequently, the capacity of information relating to the node table is as follows:

$$6\times(4+1)=30 \text{ [bytes]}$$

(where 24 bytes correspond to coordinate information, and 6 bytes correspond to connection information). On the other hand, the number of groups of main roads which can be drawn with one stroke of the brush is two, i.e., nodes D→A→C→F and nodes A→B→C→E. Accordingly, the number of links used for representing the road groups ("→" in the above sentence) is six. The road table is composed of information relating to a pointer (one byte) and a link, i.e., a cost (one byte), as shown in FIG. 4, for each link. Further, each of road groups requires a head node pointer(1 byte). Consequently, the capacity of information relating to the road table is as follows:

$$6\times(1+1)+2=14 \text{ [bytes]}$$

(where all 14 bytes correspond to connection information).

A required capacity is then calculated with respect to road information relating to minor streets. Element points constituting the minor streets are numbers 1 to 24, as shown in FIG. 7. In the recording format in the first embodiment, all roads are processed by a one-stroke drawing system, which is unlike that in the first document. When the numbers are overlapped with each other (for example, numbers 4 and 13), their road information must be recorded respectively. The minor street table is composed of information relating to the longitude and the latitude (2×2=4 bytes) and a flag (0.125×4=0.5 bytes), as shown in FIG. 4, for each node. Consequently, the capacity of information relating to the minor street table is as follows:

$$24\times(4+0.5)=108 \text{ [bytes]}$$

(where 96 bytes correspond to coordinate data, and 12 bytes correspond to connection data).

When the respective calculated values are compared with each other, the results shown in FIG. 21(b) are obtained. That is, when the same road information is recorded in the recording format in the first embodiment, a capacity of 106 bytes can be reduced with respect to the map information shown in FIG. 7, as compared with that in the recording format described in the first document. When the recording format in the fist embodiment of the present invention is used, therefore, it is possible to compress map information.

As described in the foregoing, when the recording format in the first embodiment is used, it is possible to compress the map information. However, the recording format of minor streets (the minor street table) differs from the recording formats (the node table and the road table) used for main roads. In order to obtain road information connected to a certain element point in the recording format of minor streets, therefore, element points having the same coordinate value as that of the element point must be searched for with all the element point information as an object. This is simple processing. However, the processing time cannot be ignored when the processing is repeated many times.

On the other hand, when route searching processing is performed, the use of only information relating to minor streets in the vicinity of the current position and information relating to minor streets in the vicinity of a destination is sufficient in most cases with respect to information relating to minor streets. Even if it takes a little retrieval time to obtain connection information of roads with respect to the minor streets, therefore, processing time of the whole of the route searching processing is hardly affected. In addition thereto, in a detailed map of an urban area at the present time, not less than the half of all the roads in a map unit may, in some cases, be minor streets.

Therefore, the road map information readout apparatus according to the first embodiment of the present invention shortens the processing time which is increased as road information relating to minor streets is compressed by providing the step of judging the necessity of connection information of minor streets (FIG. 2, Step S203).

In FIG. 2, when the map information read out in the step S202 is merely used for display of a map, no connection information of minor streets is required. In this case, therefore, the road map information readout apparatus according to the first embodiment of the present invention performs map display processing without passing through special processing such as conversion of the format of the connection information of minor streets (step S204). On the other hand, when the map information is used for route searching processing or the like, the connection information of minor streets is required. Processing for retrieving connected roads having the same element point is required many times for the apparatus. Consequently, in this case, the apparatus reads out the minor street table in the map unit, selects an intersection out of the respective element points, and searches for connected roads, to convert the format of the connection information of minor streets into the same format as that of the connection information of main roads (that is, the format of the node table and the road table) (step S205). The conversion of the format can be easily carried out by repeating the processing for retrieving the connected roads with respect to all the element points in the minor street table (step S205). The apparatus carries out the conversion of the format, after which the program proceeds to the step S204. In the step S204, map information is outputted on the basis of the information relating to both main roads and minor streets.

The format conversion processing, of course, requires a certain amount of time. However, the processing is increased in speed as a whole when both information relating to main roads and minor streets are recorded in the format in the first embodiment, and the above-mentioned judging step 203 is provided, as compared with a case where both information relating to main roads and minor streets are recorded in the same format, and roads connected to each of element points constituting the minor streets are searched for each time in route searching processing.

As described in the foregoing, in the road map information readout apparatus according to the first embodiment, the compression of the information size precedes the ease of the acquisition processing of the connection information with respect to the minor streets which are low in frequency of utilization of road connection information. Consequently, the road map information readout apparatus according to the first embodiment can significantly reduce the total capacity of information relating to a map required for the apparatus.

Although in the road map information readout apparatus according to the first embodiment, the connection information of minor streets is utilized for the route searching processing or the like after the format thereof is converted in the step S205, the connection information of minor streets may be utilized as it is in the route searching processing or the like. Further, the format to be converted in the step S205 is not limited to the format of the main roads in the first embodiment. Another format may be converted, provided that it has not mere map information but also connection information.

(Second Embodiment)

Description is now made of a road map information readout apparatus according to a second embodiment of the present invention. The road map information readout apparatus according to the second embodiment of the present invention is invented on the basis of the road map information readout apparatus according to the first embodiment of the present invention, where the construction of the apparatus (FIG. 1), a flow chart of operations (FIG. 2), and a map unit (FIG. 3) are common. The apparatus according to the second embodiment differs from the apparatus according to the first embodiment in the recording format of a minor street table.

In the recording format of the minor street table in the above-mentioned first embodiment, in order to obtain roads to be connected to a certain element point, element points having the same coordinates as those of the element point must be searched from element point information. In the recording format in the first embodiment, a plurality of element points occur on the same coordinates, thereby information is forced to be redundant.

Therefore, an improvement of the recording format in the first embodiment made in order to solve the above-mentioned problem is the road map information readout apparatus according to the second embodiment of the present invention. Description is now made using FIGS. 8 and 9.

Figure 8:
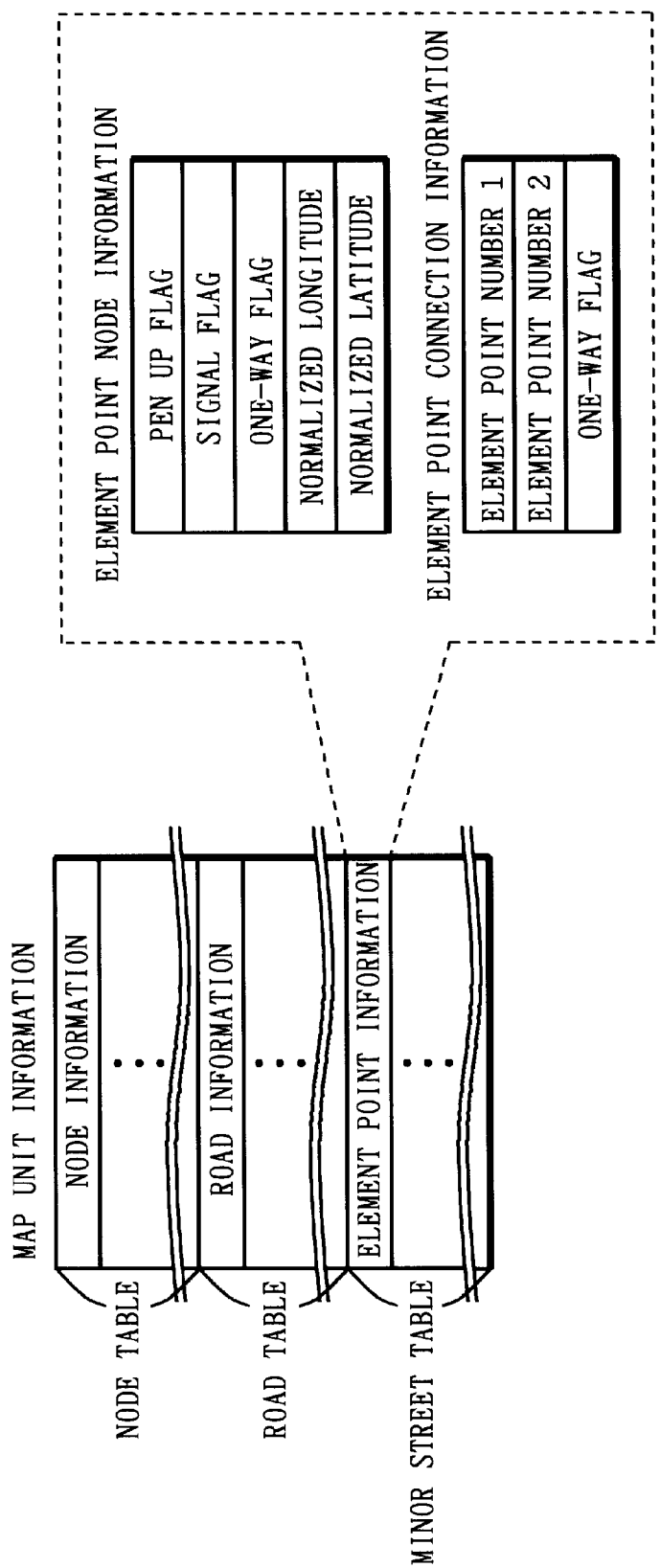
FIG. 8 is a diagram showing the recording format of map unit information in a road map information readout apparatus according to a second embodiment of the present invention.

FIG. 8 illustrates the structure of the minor street table in the second embodiment. In FIG. 8, the structure of element point node information in element point information is the same as the structure of the element point information in the first embodiment (see FIG. 4). The structures of a node table and a road table are also the same as those shown in FIG. 4 and hence, the description thereof is not repeated. In short, the minor street table in the second embodiment is newly provided with element point connection information. Only connection between element points already defined is recorded in the element point connection information.

Figure 9:
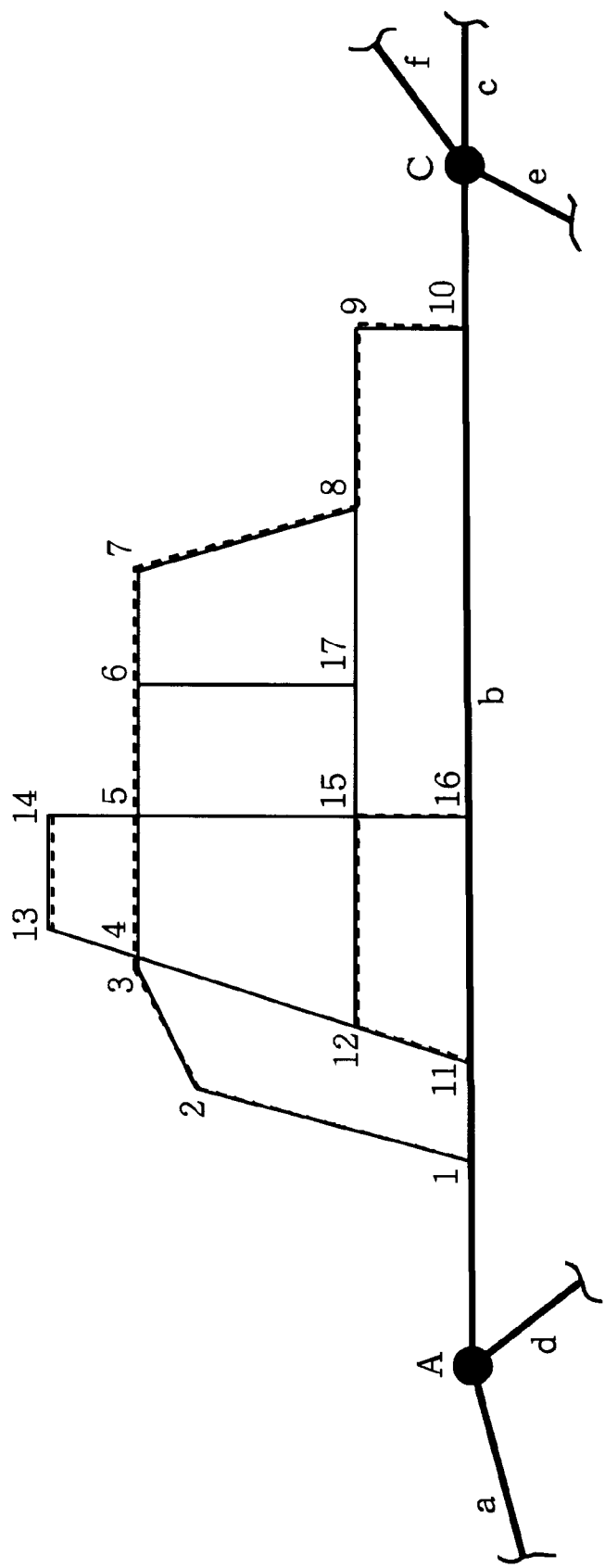
FIG. 9 is a diagram showing, in an enlarged manner, minor streets shown in FIG. 5 relating to the description of the recording format in the second embodiment.

FIG. 9 is a diagram showing a map of minor streets corresponding to FIG. 7 for explaining the procedure for recording in the second embodiment. Also in the procedure for recording in the second embodiment, a one-stroke drawing system is employed. Element points 1 to 10 are first connected with one stroke of the brush in FIG. 9. The foregoing is the same as that in the first embodiment. They differ in that in the second embodiment, the condition that the subsequent drawing with one stroke of the brush is so made as not to pass on element points already defined (drawn with one stroke of the brush) is established. Consequently, in FIG. 9, a road is drawn in such order as element points 11→12→15→16. After the road is drawn, element points 13 and 14 out of the remaining element points can be connected with one stroke of the brush under the foregoing condition. By the foregoing processing, a road indicated by a thick broken line shown in FIG. 9 can be recorded using a one-stroke drawing system. An element point 17 is not recorded using a one-stroke drawing system, thereby it is recorded in the form of dots in element point node information with a pen up flag being on as "1".

By the foregoing processing, all the element points (1 to 17) constituting the minor streets shown in FIG. 9 can be recorded in the element point node information. However, this is not sufficient to represent the minor streets. Therefore, connection information is then recorded with respect to portions where element points are not connected. Specifically, in FIG. 9, the element points 4 and 12, 4 and 13, 5 and 14, 5 and 15, 6 and 17, 8 and 17, and 15 and 17 are not respectively connected to each other, thereby connection information therebetween is further recorded. In order to record the connection information, the element point connection information is used in the second embodiment. The portions where element points are not connected to each other are recorded in the order in which the element points are defined in the element point node information in the format of the numbers of both the element points and one-way information therebetween. In the recording format in the second embodiment, therefore, all the minor streets can be represented.

According to the recording format in the second embodiment, when another element point connected to a certain element point is searched for, it is searched for by not the coordinates but the number of the element point. That is, an object to be searched for is decreased from two information relating to the longitude and the latitude to one information relating to the number of the element point, thereby the search can be made at a high speed. Further, the recording format in the second embodiment has the advantage that element point information can also be respectively recorded with respect to a plurality of element points which have the same coordinates but to which no connection is made as in solid crossing. It goes without saying that the recording format in the second embodiment realizes compression of information as will be described.

With respect to the recording format in the second embodiment, the capacity of map information is calculated. First, the structure of the element point node information in the minor street table is the same as the structure of the element point information in the recording format in the first embodiment. Consequently, a capacity required to record the element point node information of all of 17 element points is as follows:

$$17 \times (4+0.5) = 76.5 \text{ [bytes]}$$

The element point connection information in the minor street table is composed of information relating to the numbers of element points at both ends ($1 \times 2 = 2$ bytes) and a one-way flag ($0.125 \times 2 = 0.25$ bytes) for each connection information, as shown in FIG. 8. Consequently, the capacity of information relating to the minor street table is as follows:

$$7 \times 2.25 = 16 \text{ [bytes]}$$

Capacities required with respect to the node table and the road table of main roads are the same as the values calculated in the description of the first embodiment, which are respectively 30 bytes and 14 bytes.

Consequently, the total capacity required to record the map information is as follows:

$$76.5 + 16 + 30 + 14 = 136.5 \text{ [bytes]}$$

As described in the foregoing, in the recording format in the second embodiment, the amount of information to be recorded of the map information can be reduced, and the acquisition processing speed of the connection information of minor streets can be improved, as compared with those in the recording format in the first embodiment.

(Third Embodiment)

Description is now made of a road map information readout apparatus according to a third embodiment of the present invention. The road map information readout apparatus according to the third embodiment of the present invention is invented on the basis of the road map information readout apparatus according to the first embodiment of the present invention, where the construction of the apparatus (FIG. 1), a flow chart of operations (FIG. 2), and a map unit (FIG. 3) are common. The apparatus according to the third embodiment differs from the apparatus according to the first embodiment in that the recording format of a minor street table is improved, and a shape table is further provided.

In the recording formats of the minor street table in the above-mentioned first and second embodiments, in order to obtain an intersection of a main road and a minor street, it must be judged whether or not the coordinates of element points constituting the minor street exist on the shape of the main road. Consequently, the road map information readout apparatuses according to the first and second embodiments require much time to process acquired information in route searching processing or the like.

Therefore, an improvement of the recording formats in the first and second embodiments made in order to solve the above-mentioned problem is the road map information readout apparatus according to the third embodiment of the present invention. Description is now made using FIGS. 10 and 11.

Figure 10:
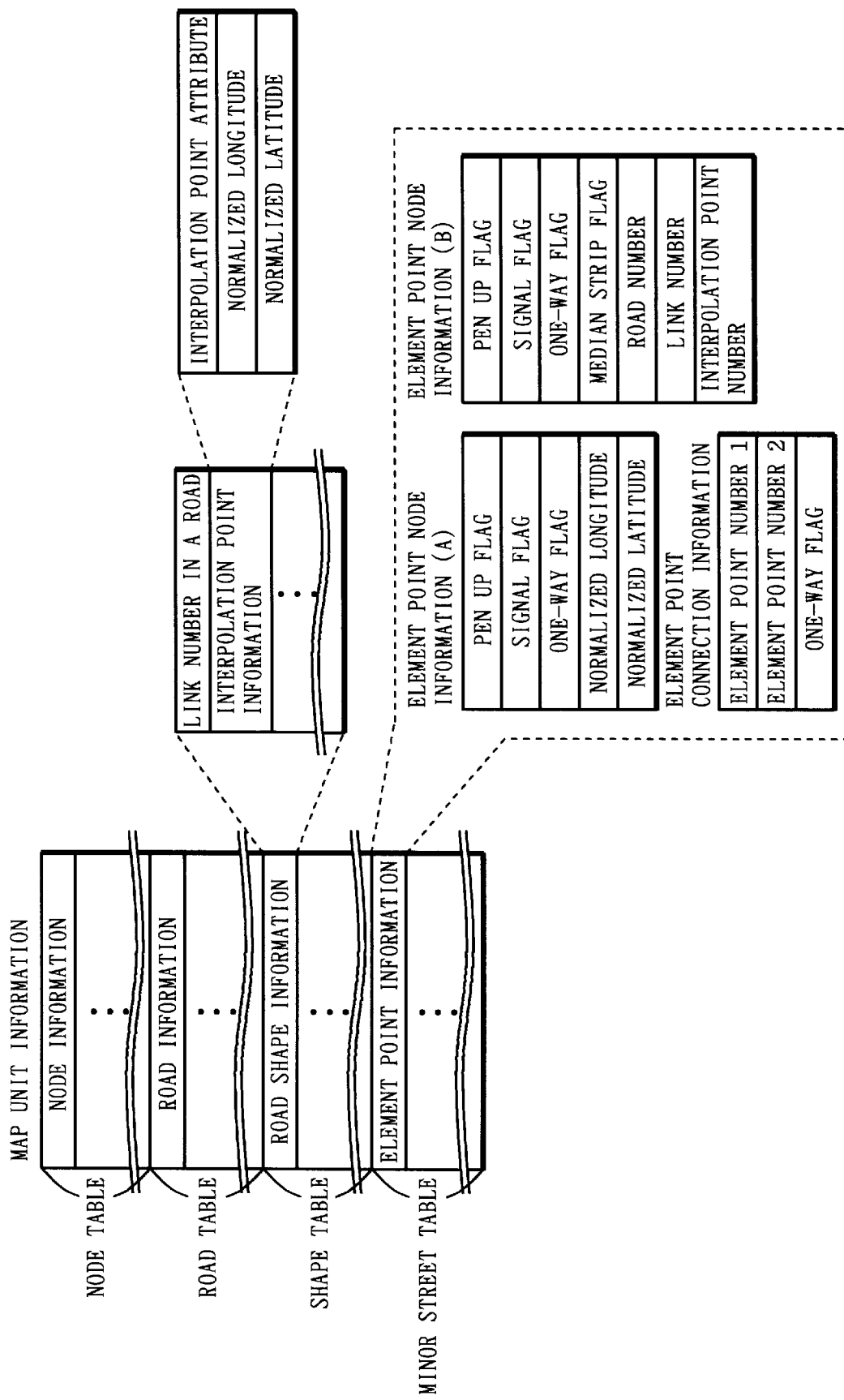
FIG. 10 is a diagram showing the recording format of map unit information of a road map information readout apparatus according to a third embodiment of the present invention.

FIG. 10 illustrates the structures of the shape table and the minor street table in the third embodiment. In FIG. 10, the structure of element point node information (A) and element point connection information in element point information is the same as the structure of the element point information in the second embodiment (see FIG. 8). The structures of a node table and a road table are the same as the structures shown in FIG. 4 and hence, the description thereof is not repeated. In short, in the recording format in the third embodiment, the shape table is newly provided, and element point node information (B) is further provided in the minor street table.

The shape table will be first described. As shown in FIG. 10, the shape table has road shape information. The road shape information is composed of a link number in a road and interpolation point information. The interpolation point information is composed of an interpolation point attribute and coordinate information relating to normalized longitude and normalized latitude.

The road shape information is recorded for each road in the same row as road information in the road table. In the road shape information, the link number and the interpolation point information in the road are recorded in the order in which the link information is recorded in the road information in FIG. 4. When a plurality of links respectively have shapes in the same road, i.e., the same node, a plurality of the link numbers and interpolation point information shall be recorded in a row.

Figure 11:
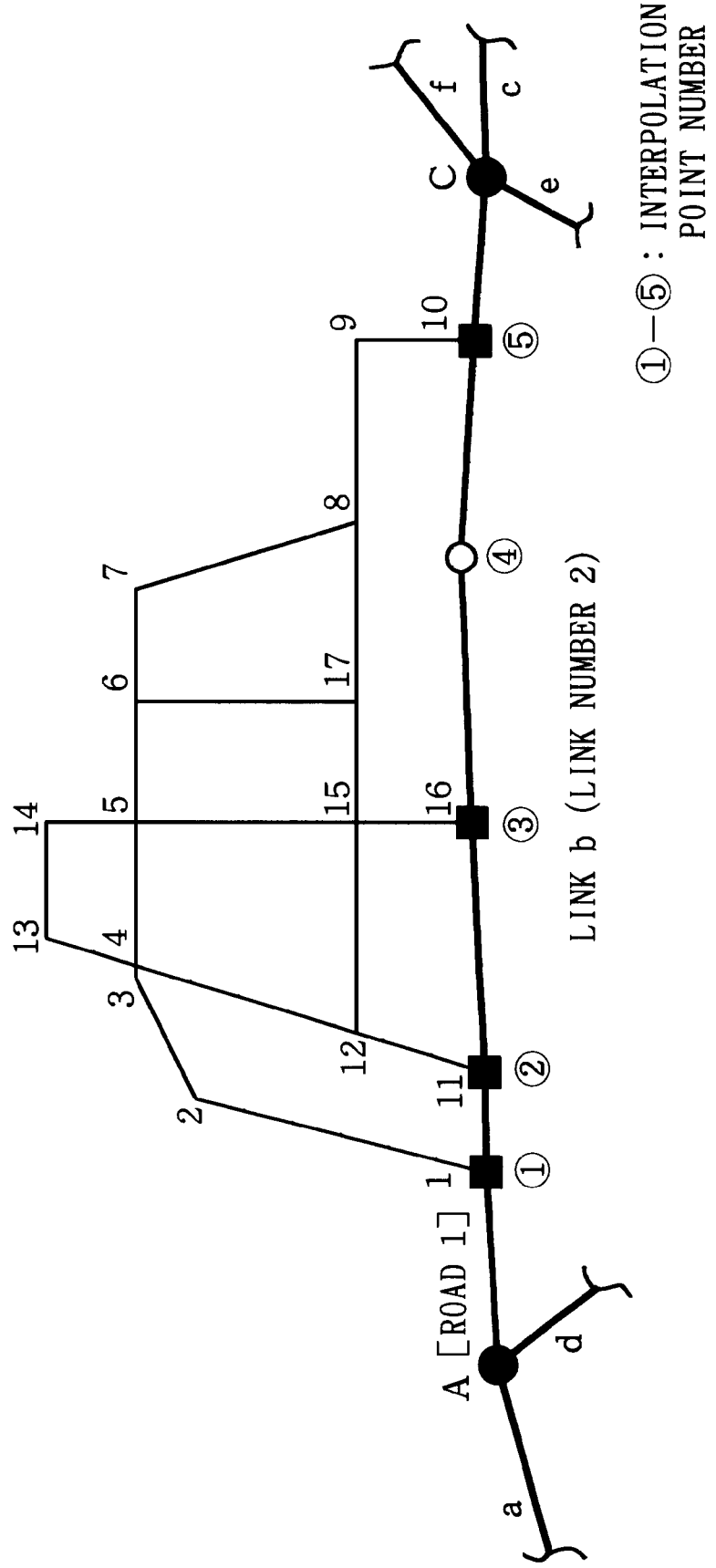
FIG. 11 is a diagram showing, in an enlarged manner, minor streets shown in FIG. 5 relating to the description of the recording format in the third embodiment.
Figure 12A:
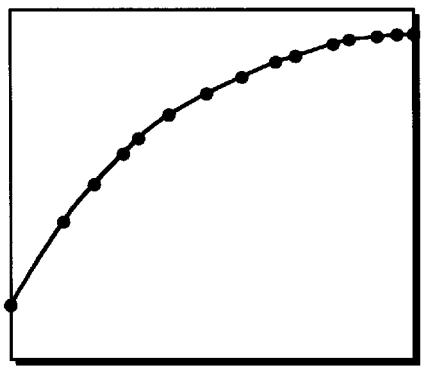
FIGS. 12(a)–12(f) are diagrams showing one example of the representation of a road shape by interpolation points in the third embodiment of the present invention.
Figure 12B:
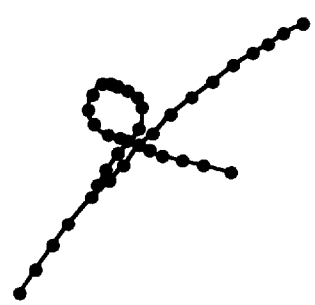
Figure 12C:
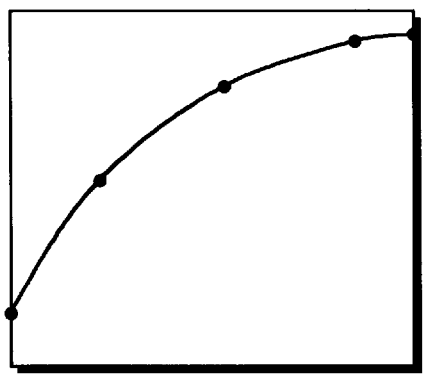
Figure 12D:
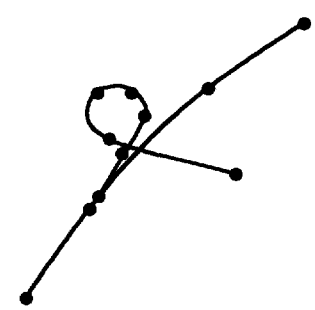
Figure 12E:
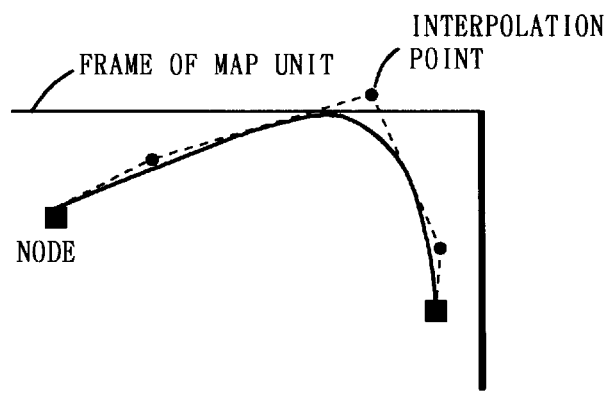
Figure 12F:
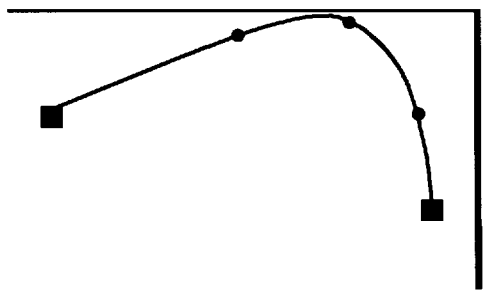

The interpolation point information is information representing the shape of a link. Although the coordinates of an interpolation point are taken as normalized longitude and normalized latitude in FIG. 10, they may be differential values from the coordinates of a head node of the link, for example. The interpolation point attribute is used for distinguishing an interpolation point for representing the link shape and an interpolation point which is an intersection with the minor street (which is represented as an auxiliary point in the claim 4). For example, FIG. 11 is a diagram showing interpolation points on a link b (a lin between nodes A and C). In FIG. 11, solid square points (①, ②, ③ and ④) are intersections of the link b and minor streets, and a hollow round point (④) is an interpolation point for representing a link shape. When the link b is represented, therefore, the node A and the interpolation point ④ and the interpolation point (and the node C may be respectively connected to each other by straight lines. The interpolation points are respectively assigned numbers in the order recorded. For example, in the link b, numbers are assigned in the order from the left (in the direction from the node A to the node C).

Description is now made of the minor street table. As described above, the recording format in the third embodiment differs from the recording format in the second embodiment in that the element point information has the element point node information (B). When an element point on the minor street intersects a main road at an interpolation point, information for specifying the main road having the interpolation point and information for specifying the interpolation point itself are recorded as connection information of the element point in the element point node information (B). However, the interpolation point is an intersection with the main road, and is also an element point node on the minor street. Therefore, the element point node information (B) has a pen up flag, a signal flag and a one-way flag as in the first embodiment. A median strip flag is a flag indicating whether or not, at the intersection, a median strip exists on the side of the main road. The median strip flag indicates "1" when there is a median strip on the side of the main road, while being "0" when there is no median strip. When there is a median strip, vehicles cannot turn to the right, thereby information relating to the median strip flag is important in route searching processing. The road number, the link number and the interpolation point number are information in which the positions of main roads which intersect each other are recorded. The positions of the main roads which intersect each other can be known from the minor street table by the information. Consequently, the road map information readout apparatus according to the third embodiment can specify an intersection of a main road and a minor street without requiring a coordinate calculation. For example, "1", "2", and "3" are respectively recorded in the road number, the link number, and the interpolation point number with respect to an element point 16 shown in FIG. 11, for example. When the vicinity of an element point 5 shown in FIG. 11 is taken as a destination, therefore, the apparatus can calculate a route connected to the minor street from the position of the interpolation point ③ on the link b which is the main road (which coincides with the element point 16 on the minor street) and can easily display the route by the information.

As described in the foregoing, in the recording format in the third embodiment, the interpolation points on the main road are recorded in the shape table, and respective information relating to the road number, the link number, and the interpolation number are recorded in the minor street table. Consequently, the road map information readout apparatus according to the third embodiment knows the positions of the main roads which intersect each other from the minor street table, to shorten the time required for processing such as route searching processing. An object of the third embodiment is to shorten the processing time. From the viewpoint of reducing the amount of information, therefore, the amount of information is increased as will be described, as compared with that in the second embodiment (the amount of information is, of course, decreased, as compared with that in the conventional example).

With respect to the recording format in the third embodiment, the capacity of map information is calculated. First, the structure of the element point node information (A) in the minor street table is the same as the structure of the element point information in the recording format in the second embodiment. However, element points (1, 10, 11, and 16) which intersect the main road are excluded, so that the number of objects to be recorded is 13. Therefore, a capacity required to record the element point node information (A) of all the 13 element points is as follows:

13×(4+0.5)=58.5 [bytes]

Element point connection information in the minor street table is the same as the structure of the element point connection information in the recording format in the second embodiment. Consequently, a capacity required to record the element point connection information is as follows:

7×2.25≈16 [bytes]

The element point node information (B) is composed of information relating to each flag (0.125×5=0.625 bytes) and each number (1×3=bytes) for each of the element points 1, 10, 11 and 16 which intersect the main road. Consequently, a capacity required to record the element point node information (B) of all the four element points which intersect the main road is as follows:

4×(0.625+3)=14.5 [bytes]

Further, the road shape information in the shape table is composed of information relating to the link number in a road (one byte), the interpolation attribute in the interpolation point information (one byte), and the coordinates of the longitude and the latitude (2×2=4 bytes). Consequently, a capacity required to record the road shape information is as follows:

5×(1+1+4)=30 [bytes]

A capacity required with respect to the node table and the road table of the main road is the same as the values calculated in the description of the first embodiment, which are respectively 30 bytes and 14 bytes.

Consequently, the total capacity required to record the map information is as follows:

58.5+16+14.5+30+30+14=163 [bytes]

As described in the foregoing, in the recording format in the third embodiment, the amount of information to be recorded of the map information can be further decreased, as compared with that in the conventional recording format. Further, in the recording format in the third embodiment, an intersection of a main road and a minor street can be found without calculating the coordinates of interpolation points, thereby the acquisition processing speed of connection information of minor streets can be improved, as compared with that in the recording format in the second embodiment.

Although in the above-mentioned description, a method of connecting interpolation points to each other by a straight line is employed in order to represent the shape of a link, the number of interpolation points can be significantly reduced by using curve interpolation in a bent road or a highway in which the number of interpolation points is large. Therefore, the capacity of the map information can be further compressed.

For example, a main lane of a highway is gently curved to cross a map unit in many cases, as shown in FIG. 12(*a*). Further, in an interchange, a ramp, a junction, and the like, a lot of roads are as shown in FIG. 12(*b*). In order to smoothly draw such a road shape by a linear approximation system, a lot of interpolation points are required (see FIGS. 12(*a*) and 12(*b*)). Also in the case of such a road, however, the number of interpolation points can be significantly reduced, and a smooth road shape can be displayed, as shown in FIGS. 12(*c*) and 12(*d*), by using a curve approximation system.

However, slight attention must be paid to the curve interpolation system. For example, when processing is performed using a "B (Basis) spline function" as the curve interpolation system, the shape of an interpolated curve becomes a shape in contact with a straight line connecting the interpolation points. In a system using the B spline function, therefore, a drawn curve does not pass on the interpolation points (see FIG. 12(*e*)). Therefore, when a curved road in the vicinity of a boundary of a map unit is represented by the system using the B spline function, the position of the interpolation point may be a coordinate value outside the frame of the map unit (see FIG. 12(*e*)). This portion of the road having the interpolation point outside the frame cannot be drawn.

As described in the foregoing, the normalized longitude and normalized latitude, which are coordinates in the frame of the map unit, are generally employed as the coordinates of an interpolation point. Consequently, not the B spline system but a system for interpolating a curve passing on interpolation points as shown in FIG. 12(*f*) must be employed for curve interpolation.

(Fourth Embodiment)

Description is now made of a road map information readout apparatus according to a fourth embodiment of the present invention. The road map information readout apparatus according to the fourth embodiment of the present invention is invented on the basis of the road map information readout apparatuses according to the first, second and third embodiments of the present invention, where the construction of the apparatus (see FIG. 1), a flow chart of operations (FIG. 2), and a map unit (FIG. 3) are common. The apparatus according to the fourth embodiment differs from the apparatus according to the third embodiment in that recording of connection information between groups is provided in a minor street table.

In the recording formats of the minor street table in the above-mentioned first, second and third embodiments, the format of connection information must be converted with all the element point information in the map unit as an object in the step S205 shown in FIG. 2. However, connection information of minor streets required to perform route searching processing or the like are actually only a part of the map unit in many cases. Since the road map information readout apparatuses according to the first, second and third embodiments perform format conversion processing also with respect to the minor streets which are not required, therefore, much time is required to process acquired information in the route searching processing or the like.

Therefore, an improvement of the recording format in the first, second and third embodiments to classify minor streets into groups and manage the groups in order to solve the above-mentioned problem is the road map information readout apparatus according to the fourth embodiment. Description is now made using FIGS. 13 and 14.

Figure 13A:
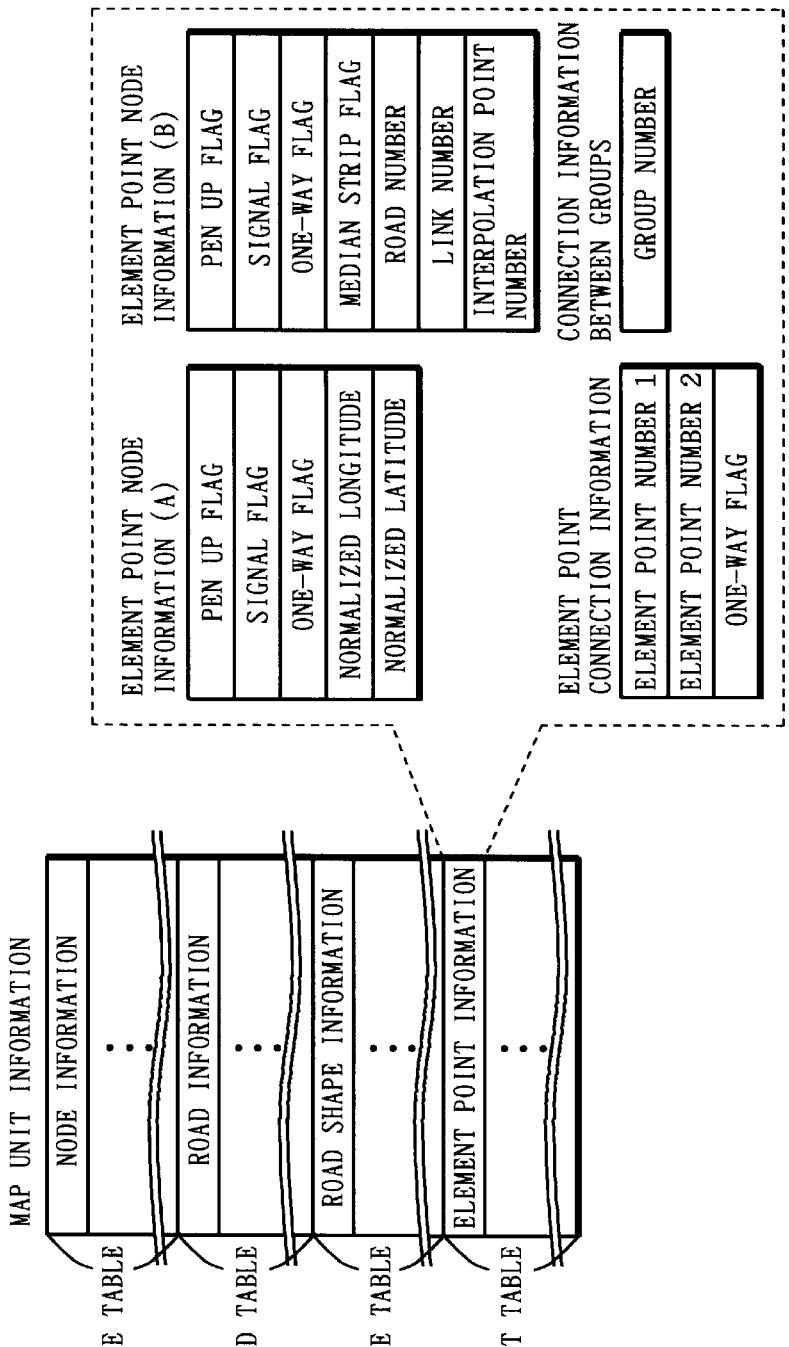
FIGS. 13(a)–13(b) are diagrams showing the recording format of map unit information of a road map information readout apparatus according to a fourth embodiment of the present invention.
Figure 13B:
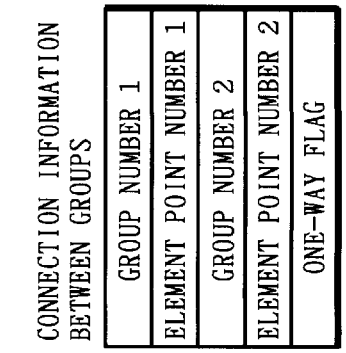

FIG. 13(*a*) illustrates the structure of a minor street table in the fourth embodiment. In FIG. 13(*a*), the structure of element point node information (A), element point node information (B) and element point connection information in the element point information is the same as the structure of the element point information in the third embodiment (see FIG. 10). Further, the structures of a node table, a road table and a shape table are also the same as the structures shown in FIGS. 4 and 10 and hence, the description thereof is not repeated. In short, in the recording format in the fourth embodiment, the connection information between groups is newly provided in the minor street table. In the connection information between groups, a group number representing the identification number of a minor street group is recorded.

Figure 14:
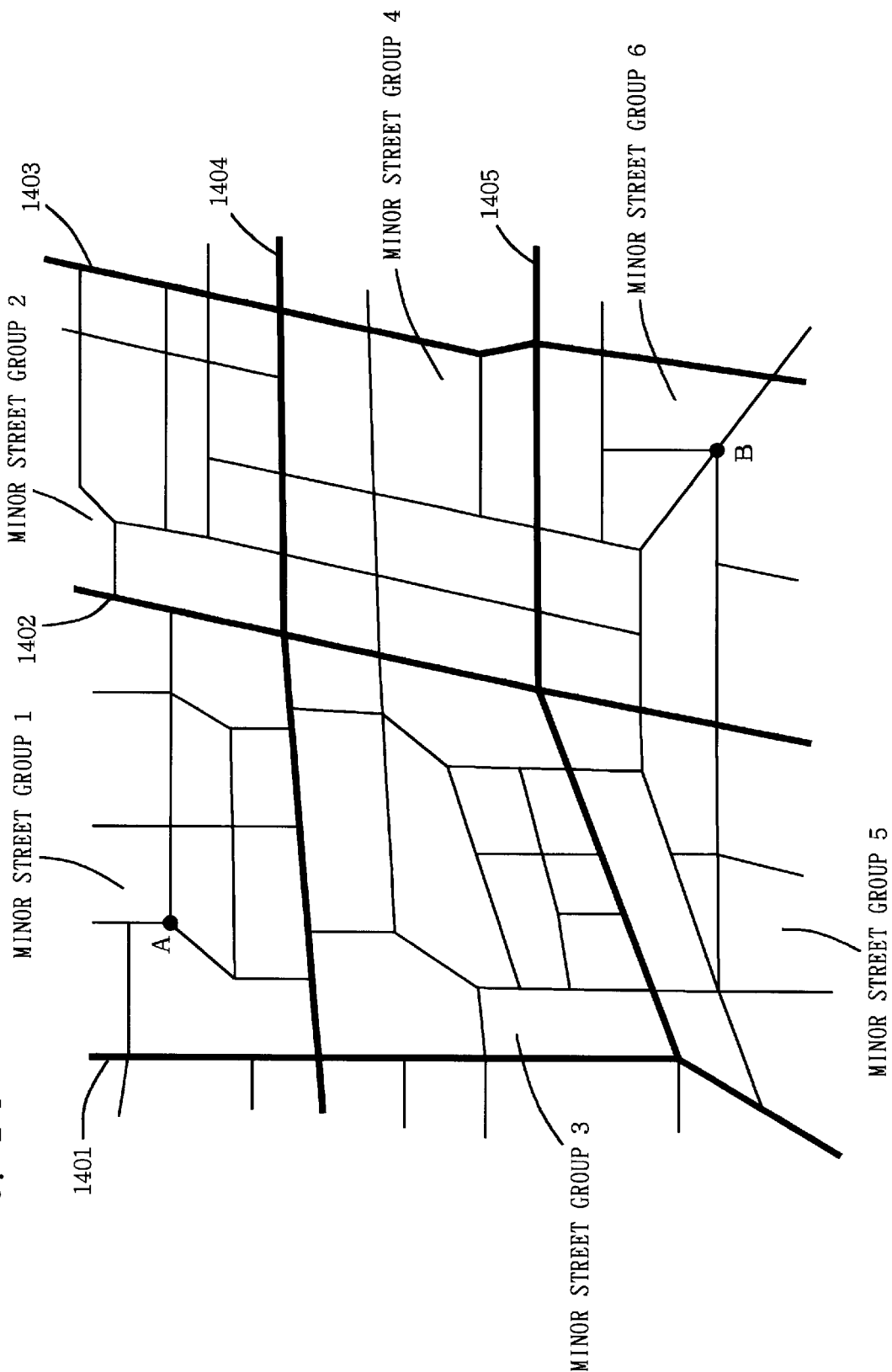
FIG. 14 is a diagram showing a road network relating to the description of the recording format in the fourth embodiment.

FIG. 14 illustrates a map of a certain area. In FIG. 14, a thick line represents a main road, and a narrow line represents a minor street. In the recording format in the fourth embodiment, minor streets in the map unit are grouped by sections enclosed by the main roads, as shown in FIG. 14 (minor street groups 1 to 6 in FIG. 14). Element point information is defined in the same procedure as the procedure in the third embodiment for each group, to represent the minor streets. However, the identification numbers of the minor street groups are required due to dividing the minor streets. In the recording format in the fourth embodiment, therefore, the identification numbers of the minor street groups are recorded by the connection information between groups.

The minor streets are thus grouped, so that the conversion of the format of the connection information of minor streets in the step S205 shown in FIG. 2 can be carried out by selecting only a portion of the required minor street group. Therefore, it is possible to convert the format of information relating to the minor streets at high speed. For example, when route searching processing is performed from a point A to a point B in FIG. 14, only the information relating to the minor street groups 1 and 6 may be subjected to conversion processing with respect to the minor streets, to retrieve a route. That is, a first route leading to a road 1404 (or a road 1402, etc.) from the point A in route searching in the minor street group 1 and a second route leading to the road 1402 (or a road 1405, etc.) from the point B in route searching in the minor street group 6 may be respectively found out. Consequently, the first route and the second route can be connected to each other by main roads by only route searching of the main roads.

By using the recording format in the fourth embodiment, therefore, the amount of information relating to minor streets to be processed can be kept to a minimum, as compared with those in the first to third embodiments in which form conversion is carried out with respect to all minor streets in the map unit. In the recording format, therefore, it is possible to shorten time required for the entire route searching processing.

Although in the fourth embodiment, the minor streets are grouped by sections enclosed by the main roads, the minor street groups may be grouped upon being subdivided in order to increase the processing speed. In this case, however, information required to connect the minor street groups is required as will be described.

Figure 15:
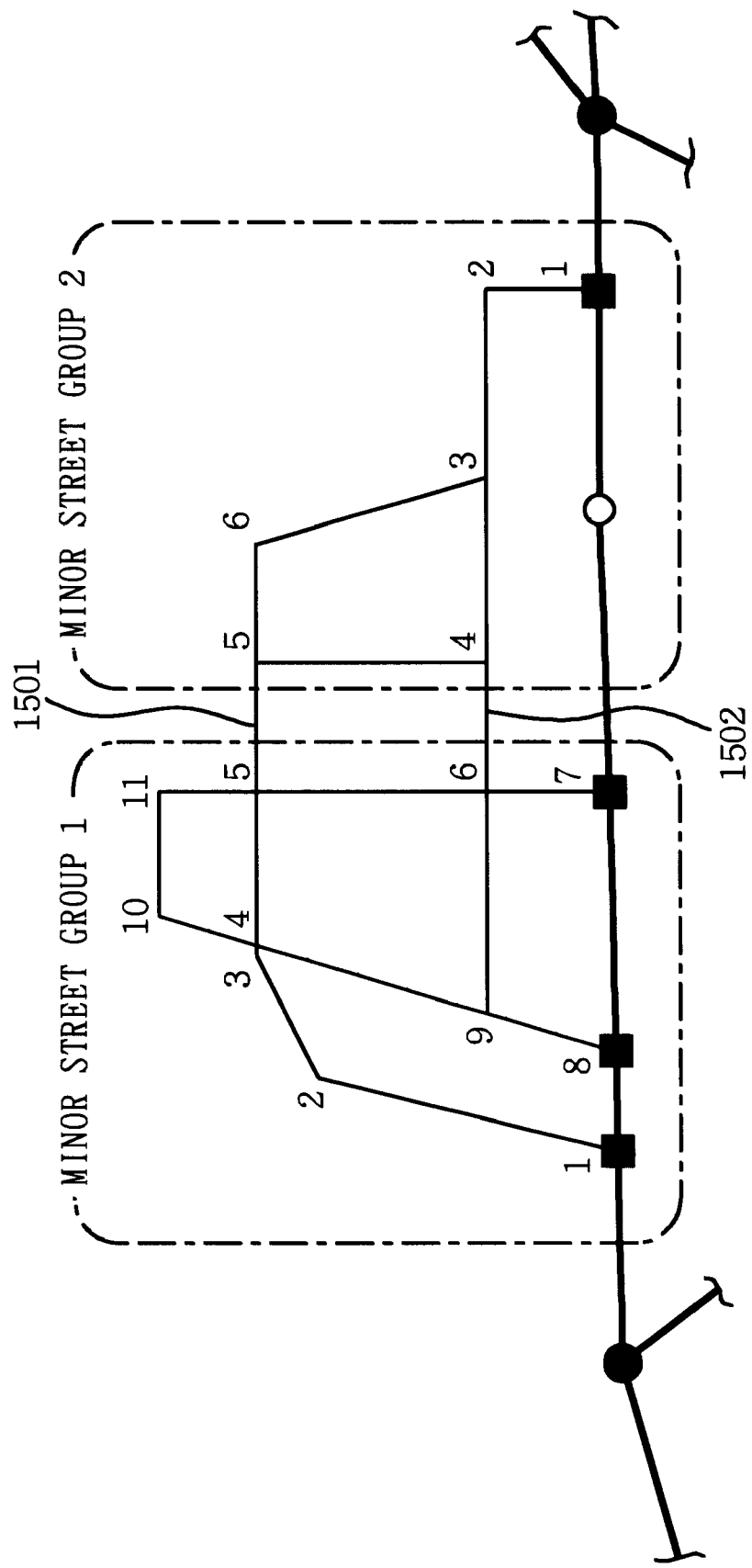
FIG. 15 is a diagram showing a road network relating to the description of the recording format in the fourth embodiment.

FIG. 15 illustrates a specific example in which minor street groups are further grouped. In FIG. 15, roads 1501 and 1502 are roads which extend over minor street groups 1 and 2, thereby connection information of the roads, that is, information indicating an element point number 5 in the minor street group 1 and an element point number 5 in the minor street group 2 and the direction of passage thereof, or information indicating an element point number 6 in the minor street group 1 and an element point number 4 in the minor street group 2 and the direction of passage thereof are required. In order to record the information, the recording format in the fourth embodiment requires in connection information between groups a group number 1 indicating one of the minor street groups, an element point number 1 indicating an element point in the one minor street group, a group number 2 indicating the other minor street group to which the one element point is connected, an element point number 2 indicating an element point in the other minor street group, and a one-way flag (see FIG. 13(b)).

(Fifth Embodiment)

Description is now made of a road map information readout apparatus according to a fifth embodiment of the present invention. The road map information readout apparatus according to the fifth embodiment of the present invention is invented on the basis of the road map information readout apparatus according to the first embodiment of the present invention, where the construction of the apparatus (FIG. 1), a flow chart of operations (FIG. 2) and a map unit (FIG. 3) are common. The apparatus according to the fifth embodiment differs from the apparatus according to the first embodiment in the recording format of link information in a road table.

In the above-mentioned first embodiment, links having the same road attribute (for example, a highway or a country road) are integrated and are recorded as one road information, to compress the capacity of the map information. Since the links to be integrated are limited to ones which can be drawn with one stroke of the brush, there exist a lot of links which are not conveniently integrated.

In order to solve the above-mentioned problem, an improvement of the recording format in the first embodiment to make it possible to integrate links having the same type of road attribute which are excluded from drawing with one stroke of the brush is the road map information readout apparatus according to the fifth embodiment of the present invention. Description is now made using FIGS. 16 and 17.

Figure 17:
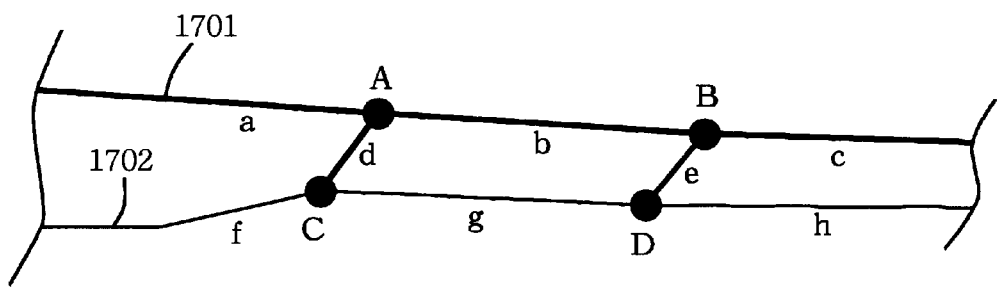
FIG. 17 is a diagram showing a road network relating to the description of the recording format in the fifth embodiment.
Figure 20:
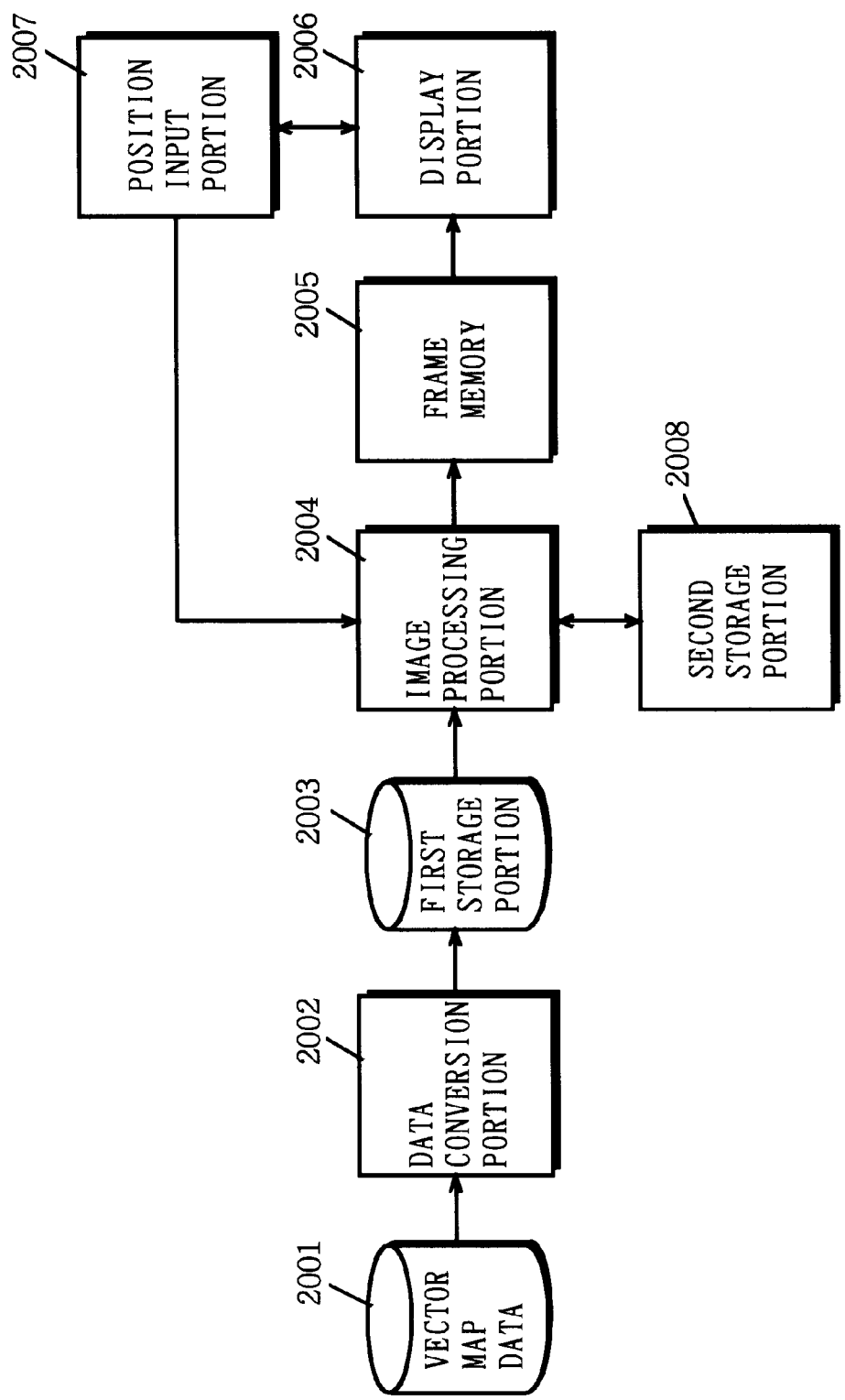
FIG. 20 is a block diagram showing a construction of a conventional map information display device.

FIG. 17 is a diagram showing one example of a road network in a section where a highway and a general road which cannot be integrated as described above run in parallel. FIG. 17 illustrates a case where a road 1701 which is a toll road and a road 1702 which is a general road run in parallel. As shown in the first embodiment, when roads are processed by a one-stroke drawing system, links a, b, and c can be integrated with respect to the road 1701, and links f, g, and h can be integrated with respect to the road 1702. However, links d and e leading to the general road from ramps in the toll road present a problem. Since the two links d and e are not included in drawing with one stroke of the brush, they must be respectively recorded as independent roads. For such a reason, it is frequently the case that in not only the toll road but also the general road that one road must be composed of one link.

Figure 16:
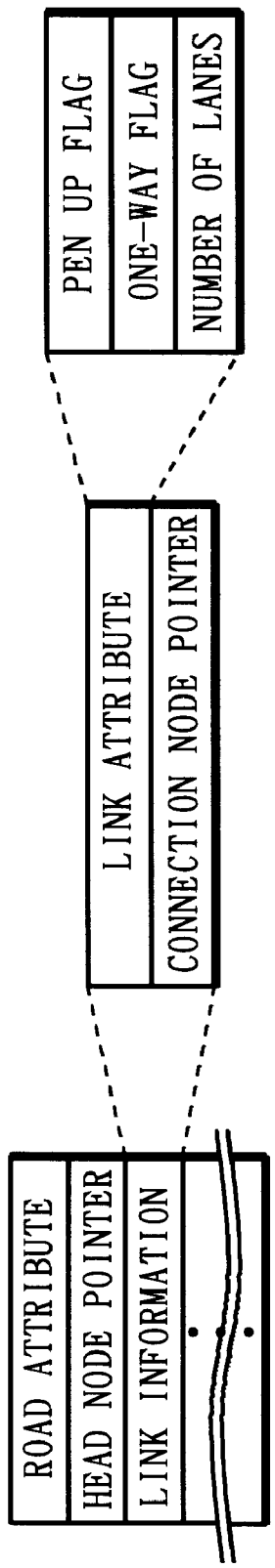
FIG. 16 is a diagram showing the recording format of map unit information in a road map information readout apparatus according to a fifth embodiment of the present invention.

In order to cope with this problem, in the recording format in the fifth embodiment, link information shown in FIG. 16 is used. In FIG. 16, a link attribute in a road table has a pen up flag. The pen up flag is used similarly to that used in a case where the above-mentioned road connection information of minor streets is recorded, which is "1" when the pen up flag represents a link which cannot be drawn with one stroke of the brush, while being generally "0". For example, when the road network shown in FIG. 17 is recorded, the links a, d, b, e and c are arranged in this order, and only the pen up flags of the link d and the link e are recorded as "1" with respect to the road 1701. The links f, g and h are arranged in this order, and all the pen up flags are recorded as "0" with respect to the road 1702.

A connection between links in a road can be definitely specified by being defined as below, for example:

1. A link whose pen up flag is "1" is defined as a branch link (the link d and the link e in FIG. 17). End point nodes of the branch link are taken as end points of the road (a node C and a node D in FIG. 17).

2. A link recorded subsequently to the branch link shares a starting point node with the branch link recorded immediately before the recording.

As described in the foregoing, according to the fifth embodiment, roads having the same type of road attribute even if they include branching (the road as shown in FIG. 17) can be managed together. In the recording format in the fifth embodiment, therefore, the number of roads recorded can be reduced, and information relating to a road attribute, a head node pointer and the like are reduced. As a result, it is possible to reduce the capacity of map information.

Although in the fifth embodiment, the branch link is composed of one link, a branch link composed of a plurality of links can be defined by recording the number of links constituting the branch link in the pen up flag.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A road map information readout apparatus, said apparatus comprising:

a road map information recording medium in which roads included in all or part of areas on a road map are previously classified into a plurality of groups in accordance with types of the roads, different recording formats are respectively assigned to the plurality of groups according to the types of the roads, and connection information of the roads included in each of the groups is recorded in accordance with the recording format assigned to the group;

readout range designation means for designating a predetermined readout range;

readout control means for reading out from said road map information recording medium the connection information corresponding to the predetermined readout range; and output means for outputting the connection information read out by said readout control means.

2. The road map information readout apparatus according to claim 1, wherein:

the plurality of groups include main road groups and sub road groups;

the roads belonging to the main road group have a relatively higher frequency of use by a user than the roads belonging to the sub road group;

the roads belonging to the sub road group have a relatively lower frequency of use by a user than the roads belonging to the main road group; and a recording format in which a recording efficiency of the road map information is higher than that assigned to the main road group is assigned to the sub road group.

3. The road map information readout apparatus according to claim 2, wherein:

the recording format assigned to the main road group is a recording format for recording, for each node, a table representing the connection state regarding each node; and the recording format assigned to the sub road group is a recording format for recording, for each node, information for specifying a node to succeed the node and a flag representing pen up or pen down.

4. The road map information readout apparatus according to claim 3, wherein:

the sub road group is further divided into a plurality of small groups; and connection information of the roads in each of the small groups and connection information of the roads connecting one or more of the adjacent small groups are further recorded in said road map information recording medium.

5. The road map information readout apparatus according to claim 3, wherein in a road shape in which a first road belonging to the main road group and a second road belonging to the sub road group intersect each other, an auxiliary point representing the interconnection on the first road and information which can specify the auxiliary point from the second road are further recorded in said road map information recording medium.

6. The road map information readout apparatus according to claim 5, wherein:

the sub road group is further divided into a plurality of small groups; and connection information of the roads in each of the small groups and connection information of the roads connecting one or more of the adjacent small groups are further recorded in said road map information recording medium.

7. The road map information readout apparatus according to claim 2, wherein:

the sub road group is further divided into a plurality of small groups; and connection information of the roads in each of the small groups and connection information of the roads connecting one or more of the adjacent small groups are further recorded in said road map information recording medium.

8. The map information readout apparatus according to claim 2, wherein in a road shape in which a first road belonging to the main road group and a second road belonging to the sub road group intersect each other, an auxiliary point representing the interconnection on the first road and information which can specify the auxiliary point from the second road are further recorded in said road map information recording medium.

9. The road map information readout apparatus according to claim 8, wherein:

the sub road group is further divided into a plurality of small groups; and connection information of the roads in each of the small groups and connection information of the roads connecting one or more of the adjacent small groups are further recorded in said road map information recording medium.

10. A road map information readout apparatus, said apparatus comprising:

a road map information recording medium in which a road whose connection state is represented with one stroke of the brush and at least one road branching from the road and having the same attribute are grouped, and connection information of both the roads is recorded as connection information in one group;

readout range designation means for designating a predetermined readout range;

readout control means for reading out from said road map information recording medium the connection information corresponding to the predetermined readout range; and output means for outputting the connection information read out by said readout control means.

11. A road map information readout apparatus, said apparatus comprising:

a road map information recording medium having road information for connecting nodes in the shape of a curve drawn on the basis of interpolation points by predetermined curve interpolation processing and having the interpolation points so recorded therein as to be positioned on the shape of the curve;

readout range designation means for designating a predetermined readout range;

readout control means for reading out from said road map information recording medium the interpolation points corresponding to the predetermined readout range; and output means for outputting the interpolation points read out by said readout control means.

12. A road map information recording medium on which road map information is recorded, wherein:

roads included in all or part of areas on a road map are previously classified into a plurality of groups in accordance with types of the roads, different recording formats are respectively assigned to the plurality of groups according to the types of the roads, and connection information of the roads included in each of the groups is recorded in accordance with the recording format assigned to the group.

13. The road map information recording medium according to the claim 12, wherein:

the plurality of groups include main road groups and sub road groups;

the roads belonging to the main road group have a relatively higher frequency of use by a user than the roads belonging to the sub road group;

the roads belonging to the sub road group have a relatively lower frequency of use by a user than the roads belonging to the main road group; and a recording format in which a recording efficiency of the road map information is higher than the assigned to the main road group is assigned to the sub road group.

14. The road map information recording medium according to claim 13, wherein:

the recording format assigned to the main road group is a recording format for recording, for each node, a table representing the connection state regarding each node; and the recording format assigned to the sub road group is a recording format for recording, for each node, information for specifying a node to succeed the node and a flag representing a pen up or pen down.

15. The road map information recording medium according to the claim 14, wherein: in a road shape in which a first road belonging to the main road group and a second road belonging to the sub road group intersect each other, an auxiliary point representing the interconnection on the first road and information which can specify the auxiliary point from the second road are further recorded.

16. The road map information recording medium according to claim 15, wherein:

the sub road group is further divided into a plurality of small groups; and connection information of the roads in each of the small groups and connection information of the roads connecting one or more of the adjacent small groups are further recorded.

17. The road map information recording medium according to claim 14, wherein:

the sub road group is further divided into a plurality of small groups; and connection information on the roads in each of the small groups and connection information of the roads connecting one or more of the adjacent small groups are further recorded.

18. The road map information recording medium according to claim 13, wherein in a road shape in which a first road belonging to the main road group and a second road belonging to the sub road group intersect each other, an auxiliary point represent the interconnection on the interconnection on the first road and information which can specify the auxiliary point from the second road are further recorded.

19. The road map information recording medium according to the claim 18, wherein:

the sub road group is further divided into a plurality of small groups; and connection information of the roads in each of the small groups and connection information of the roads connecting one or more of the adjacent small groups are further recorded.

20. The road map information recording medium according to claim 13, wherein:

the sub road group is further divided into a plurality of small groups; and connection information on the roads in each of the small groups and connection information of the roads connecting one or more of the adjacent small groups are further recorded.

21. A road map information recording medium on which road map information is recorded, wherein:

a road whose connection state is represented with one stroke of the brush and at least one road branching from the road and having the same attribute are grouped, and connection information on both the roads is recorded as connection information in one group.

22. A road map information recording medium on which road map information is recorded, wherein:

the road map information includes road information for connecting nodes in the shape of a curve drawn on the basis of interpolation points by predetermined curve interpolation processing, and has the interpolation points so recorded therein as to be positioned on the shape of the curve.

23. A road map information transmitting method for transmitting road map information to an apparatus by performing a communication, wherein:

the road map information is information in which roads included in all part of areas on a road map are previously classified into a plurality of groups in accordance with types of the roads, different recording formats are respectively assigned to the plurality of groups according to the types of the roads, and connection information of the roads included in each of the groups is recorded in accordance with the recording format assigned to the group.

24. The road map information transmitting method according to claim 23, wherein:

the plurality of groups include main road groups and sub road groups;

the roads belonging to the main road group have a relatively higher frequency of use by a user than the roads belonging to the sub road group;

the roads belonging to the sub road group have a relatively lower frequency of use by a user than the roads belonging to the main road group; and a recording format in which a recording efficiency of the road map information is higher than that assigned to the road group is assigned to the sub road group.

25. The road map information transmitting method according to claim 24, wherein:

the recording format assigned to the main road group is a recording format for recording, for each node, a table representing the connection state regarding each node; and the recording format assigned to the sub road group is a recording format for recording, for each node, information for specifying a node to succeed the node and a flag representing pen up or pen down.

26. The road map information transmitting method according to claim 25, wherein:

the sub road group is further divided into a plurality of small groups; and connection information of the roads in each of the small groups and connection information of the roads connecting one or more of the adjacent small groups are further recorded.

27. The road map information transmitting method according to claim 25, wherein in a road shape in which a first road belonging to the main road group and a second road belonging to the sub road group intersect each other, an auxiliary point representing the interconnection on the first road and information which can specify the auxiliary point from the second road are further recorded.

28. The road map information transmitting method according to claim 27, wherein:

the sub road group is further divided into a plurality of small groups; and connection information of the roads in each of the small groups and connection information of the roads connecting one or more of the adjacent small groups are further recorded.

29. The road map information transmitting method according to claim 24, wherein:

the sub road group is further divided into a plurality of small groups; and connection information of the roads in each of the small groups and connection information of the roads connecting one or more of the adjacent small groups are further recorded.

30. The road map information transmitting method according to claim 24, wherein in a road shape in which a first road belonging to the main road group and a second road belonging to the sub road group intersect each other, an auxiliary point representing the interconnection on the first road and information which can specify the auxiliary point from the second road are further recorded.

31. The road map information transmitting method according to claim 30, wherein:

the sub road group is further divided into a plurality of small groups; and connection information of the roads in each of the small groups and connection information of the roads connecting one or more of the adjacent small groups are further recorded.

32. A road map information transmitting method for transmitting road map information to an apparatus by performing a communication, wherein:

the road map information is information in which a road whose connection state is represented with one stroke of the brush and at least one road branching from the road and having the same attribute are grouped, and connection information of both the roads is recorded as connection information in one group.

33. A road map information transmitting method for transmitting road map information to an apparatus road map information) by Performing a communication, wherein:

the road map information is information having road map information connecting nodes in the shape of a curve drawn on the basis of interpolation points by predetermined curve interpolation processing and having the interpolation points so recorded therein as to be positioned on the shape of the curve.

* * * * *